(12) United States Patent
Jiang

(10) Patent No.: US 10,156,648 B1
(45) Date of Patent: Dec. 18, 2018

(54) OPTIMIZING SOURCE AND RECEIVER LOCATIONS FOR ACQUIRING SEISMIC DATA USED IN COMPRESSIVE SENSING RECONSTRUCTION

(71) Applicant: In-Depth Compressive Seismic, Inc., Houston, TX (US)

(72) Inventor: Tao Jiang, Houston, TX (US)

(73) Assignee: IN-Depth Compressive Seismic, Inc., Houston, TX (US)

( * ) Notice: Subject to any disclaimer, the term of this patent is extended or adjusted under 35 U.S.C. 154(b) by 0 days.

(21) Appl. No.: 16/034,692

(22) Filed: Jul. 13, 2018

(51) Int. Cl.
*G01V 1/00* (2006.01)

(52) U.S. Cl.
CPC .......... *G01V 1/003* (2013.01); *G01V 2210/16* (2013.01)

(58) Field of Classification Search
CPC ............................. G01V 1/003; G01V 2210/16
See application file for complete search history.

(56) References Cited

U.S. PATENT DOCUMENTS

| | | | |
|---|---|---|---|
| 9,188,693 B2 | 11/2015 | Monk et al. | |
| 9,632,193 B2 * | 4/2017 | Li | G01V 1/30 |
| 9,846,248 B2 | 12/2017 | Eick et al. | |
| 10,094,941 B2 * | 10/2018 | Mousa | G01V 1/003 |
| 2017/0235003 A1 | 8/2017 | Elboth et al. | |

OTHER PUBLICATIONS

Jesus, "Sensor Array Optimization for Seismic Estimation via Structured Sparse Inversion" IEEE 2018 (Year: 2018).*

Jiang et al, "Compressive seismic reconstruction with extended POCS for arbitrary irregular acquisition", SEG Technical Program Expanded Abstracts 2017, pp. 4272-4277, U.S.

Mosher et al, "Non-uniform optimal sampling for simultaneous source survey design", SEG Technical Program Expanded Abstracts 2014, pp. 105-109, U.S.

Mosher et al, "Compressive seismic imaging: Land vibroseis operations in Alaska", SEG Technical Program Expanded Abstracts 2017, pp. 127-131, U.S.

Allegar et al, "Introduction to this special section: Impact of compressive sensing on seismic data acquisition and processing", SEG The Leading Edge, vol. 36 issue (8), Aug. 2017, pp. 640-640, U.S.

Mosher et al, "Operational deployment of compressive sensing systems for seismic data acquisition", SEG The Leading Edge, vol. 36 issue (8), Aug. 2017, pp. 661-669, U.S.

Zwartjes et al, "Fourier reconstruction of nonuniformly sampled, aliased seismic data", SEG Geophysics, vol. 72 issue (1), Jan.-Feb. 2007, pp. V21-V32, U.S.

Stork et al, "The decline of conventional seismic acquisition and the rise of specialized acquisition: this is compressive sensing", SEG Technical Program Expanded Abstracts 2014, pp. 4386-4392, U.S.

(Continued)

*Primary Examiner* — Krystine E Breier

(74) *Attorney, Agent, or Firm* — Crain, Caton and James

(57) ABSTRACT

Source and receiver locations are optimized for acquiring seismic data used in compressive sensing reconstruction. A minimized multidimensional mutual coherence map, which includes a mutual coherence value at each (x,y) location in the mutual coherence map, is used to determine the optimal source and receiver locations from available source and receiver locations in respective, uniformly spaced, target survey grids.

18 Claims, 20 Drawing Sheets

(56) References Cited

OTHER PUBLICATIONS

Li et al, "A new finite-difference scheme for frequency-domain seismic modeling on non-uniform grids", SEG Technical Program Expanded Abstracts 2016, pp. 3846-3850, U.S.
Ning Tu, "Compressive seismic imaging designed for massively parallel co-processors", 2016 Workshop: High Performance Computing, Beijing, China, Nov. 14-16, 2016, pp. 44-45.
Jinglei et al, "Application of data regularization techniques based on compressive sensing in 3D seismic data reconstruction", SPG/SEG 2016 International Geophysical Conference, Beijing, China, Apr. 20-22, 2016, pp. 654-657.
Baraniuk et al, "Compressive sensing: A new approach to seismic data acquisition", SEG The Leading Edge,vol. 36 issue (8), pp. 642-645, Aug. 2017, U.S.
Millis Keith, "Compressive seismic imaging and source driven shooting in land acquisition: Aklaq 3D, an Alaskan norht slope case study", SEG Technical Program Expanded Abstracts 2017, pp. 132-135, U.S.
A.J Berkhout, "Changing the mindset in seismic data acquisition", SEG The Leading Edge, vol. 27 issue (7), pp. 924-938, Jul. 2008, U.S.
Mougenot et al, "How technology drives high-productivity vibroseis: a historical perspective", Geophysical Prospecting, vol. 60, No. 4, pp. 602-607, Jul. 2012, U.S.
Jordan Ellenberg, "Fill in the blanks: using math to turn lo-res datasets into Hi-res samples", Wired magazine, 8 pages, Feb. 22, 2010, U.S. (retreived from www.wired.com/2010/02/ff_algorithm/ on Aug. 2, 2018).
Davenport et al, "Introduction to compressed sensing", Cambridge University Press, pp. 1-68, Nov. 2012, UK.
Olga Holtz, "Compressive sensing: a paradigm shift in signal processing", Article, University of California, Berkeley, pp. 1-19, Dec. 16, 2008, U.S.
Glowinski, "Numerical Methods for Nonlinear Variational Problems", ISBN 978-3-662-12613-4, preface pp. xv-xix, 1984, U.S.
Gabay and Mercier, "A dual algorithm for the solution of nonlinear variational problems via finite element approximation", Computers & Mathematics with Applications vol. 2, pp. 17-40, 1976, Great Britain.
Herrmann and Hennenfent, "Non-parametric seismic data recovery with curvelet frames", Geophysical Journal International vol. 173, issue 1, pp. 233-248, UK.
Herrmann and Hennenfent, "Application of stable signal recovery to seismic data interpolation", SEG Technical Expanded Abstracts 2006, pp. 2797-2801, U.S.
Musser and Burnham, "Streamer positioning and spread stabilization for 4D seismic", SEG Technical Program Expanded Abstracts 2006, pp. 6-9, U.S.
Martin et al, "Acquisition of marine point reciever seismic data with a towed streamer", SEG Technical Program Expanded Abstracts 2000, 4 pages, U.S.
Clara Fannjang, "Better images, fewer samples: Optimizing array configuration for compressed sensing in radio interferometry", The Leading Edge, vol. 30, No. 9, Sep. 2011, pp. 996-1003, U.S.
Li et al, "Interpolated compressive sensing for seismic data reconstruction", SEG Technical Program Expanded Abstracts 2012, pp. 1-6, U.S.
Charles Mosher, "Generalized windowed transforms for seismic processing and imaging", SEG Technical Program Expanded Abstracts 2012, 5 pages, U.S.
Mosher et al, "Non-uniform Optimal Sampling for Seismic Survey Design", 74th EAGE Conference and Exhibition Incorporating EUROPEC 2012, pp. 5, Denmark.
Mosher et al, "Compressive seismic imaging", SEG Technical Program Expanded Abstracts 2012, pp. 1-5, U.S.
Li et al, "An efficient variable-splitting multiplier method for compressive sensing seismic data reconstruction", SEG Technical Program Expanded Abstracts 2012, pp. 1-6, U.S.

Yang and Zhang, "Alternating direction algorithms for-problems in compressive sensing", 2011, SIAM Journal on Scientific Computing, vol. 33, Issue 1, pp. 250-278, U.S.
Chengbo Li, "Compressive sensing for 3D data processing tasks: Applications, models, algorithms", Thesis submitted Apr. 2011, 155 pages, Houston, TX, U.S.
Xu et al, "3D common image gathers from Reverse time migration", SEG Technical Program Expanded Abstracts 2010, pp. 3257-3262, U.S.
Kaplan et al, "Data reconstruction with shot-profile least-squares migration", SEG Geophysics, vol. 75 issue (6), pp. WB121-WB136, Canada.
Felix Herrmann, "Randomized sampling and sparsity: Getting more information from fewer samples", SEG Geophysics, vol. 75 issue (6), pp. WB173-WB187, Canada.
Yang and Zhang, "Alternating direction algorithms for-problems in compressive sensing", Paper submitted Dec. 7, 2009, 25 pages, Rice University, Houston, TX, U.S.
Stephane Mallat, "Introduction to 'A wavelet tour of signal processing'", OpenStax CNX, Sep. 18, 2009, 1 page, Rice University, U.S.
Becker et al, "NESTA: A Fast and Accurate First-Order Method for Sparse Recovery", SIAM Journal on Imaging Sciences vol. 4, Issue 1, 2009, pp. 1-37, U.S.
Wang et al, "Bayesian wavefield separation by transform-domain sparsity promotion", SEG Geophysics, vol. 73 issue (5), pp. A33-A38, 2008, Canada.
Berg et al, "Probing the Pareto Frontier for Basis Pursuit Solutions", SIAM Journal on Scientific Computing, vol. 31, Issue 2, pp. 1-23, 2008, U.S.
Herrmann and Hennenfent, "Simply denoise: Wavefield reconstruction via jittered undersampling", SEG Geophysics, vol. 73 issue (3), pp. V19-V28, May-Jun. 2008, Canada.
Candes et al, "An introduction to compressive sampling", IEEE Signal Processing Magazine vol. 25, Issue: 2, Mar. 2008, pp. 21-30, U.S.
Emmanuel Candes, "Compressed sensing makes every pixel count", What's Happening in the Mathematical Sciences, vol. 7, ISBN 978-0-8212-4478-6, pp. 114-127, 2009, U.S.
Buia et al, "Shooting seismic surveys in circles", Oilfield Review, Oct. 1, 2008, vol. 20, issue: 3, pp. 18-31, U.S.
Naghizadeh et al, "Reconstruction of irregularly sampled, aliased data with multi-step autoregressive operators", SEG Technical Program Expanded Abstracts, pp. 2580-2584, 2007, U.S.
Elad et al, "Analysis versus synthesis in signal priors", Inverse Problems, vol. 23, No. 3, pp. 947-968, Jun. 2007, UK.
Richard Baraniuk, "Compressive sensing", IEEE Signal Processing Magazine, vol. 24, Issue: 4, Jul. 2007, pp. 118-124, U.S.
Ramirez et al, "Near offset data extrapolation", SEG Technical Program Expanded Abstracts vol. 25 issue (1)—Jan. 2006, pp. 2554-2558, U.S.
Candes et al, "Stable signal recovery from incomplete and inaccurate measurements", Communications on Pure and Applied Mathematics vol. 59 issue (8)—Aug. 2006, pp. 1207-1223, U.S.
Candes et al, "Sparsity and incoherence in compressive sampling", Inverse Problems, vol. 23 issue (3), Apr. 10, 2007, pp. 1-20, U.S.
Emmanuel Candes, "Compressive sampling", Proceedings of the International Congress of Mathematicians, 2006, pp. 1-20, Madrid, Spain.
Abma et al, "3D interpolation of irregular data with a POCS algorithm", SEG Geophysics, vol. 71 issue (6), pp. E91-E97, Nov.-Dec. 2006, U.S.
Joel Tropp, "Topics in sparse approximation", Dissertation submitted Aug. 2004, University of Texas, 232 pages, Austin, TX, U.S.
Liu et al, "Simultaneous interpolation of 4 spatial dimensions", SEG International exposition meeting, Oct. 10-15, 2004, 5 pages, U.S.
Maximilian Jentzsch, "Barycentric lagrange interpolation", Math 56 final project, Dartmouth College, 2014, pp. 1-8, Hanover, N.H., U.S.
Berrut et al, "Barycentric lagrange interpolation", SIAM Rev, vol. 46 issue (3), 2004, pp. 501-517, U.S.
Daniel Trad, "Interpolation and multiple attenuation with migration operators", SEG Geophysics, vol. 68 issue (6), pp. 2043-2054, Nov.-Dec. 2003, U.S.

(56) References Cited

OTHER PUBLICATIONS

Robert Stolt, "Seismic data mapping and reconstruction", SEG Geophysics, vol. 67 issue (3), pp. 890-908, May-Jun. 2002, U.S.

Donoho et al, "Optimally sparse representation in general (nonorthogonal) dictionaries via $\ell 1$ minimization", Proceedings of the National Academy of Sciences (PNAS), Mar. 4, 2003. vol. 100 issue (5), pp. 2197-2202, U.S.

Hindriks et al, "Reconstruction of 3-D seismic signals irregularly sampled along two spatial coordinates", SEG Geophysics, vol. 65 issue (1), pp. 253-263, 2000, U.S.

Marsset et al, "Very high resoolution 3D marine seismic data processing for geotechnical applications", Geophysical Prospecting. vol. 46 issue (2). pp. 105-120, 1998, U.S.

Bloor et al, "DZO for irregular 3-D acquisition", SEG Technical Program Expanded Abstracts 1996, pp. 1475-1478, U.S.

Michael Elad, "Optimized projections for compressed sensing", Department of Computer Science—Israel Institute of Technology, Oct. 19, 2006, Israel.

Sacchi et al, "Maximum entropy acquisition design and optimal interpolation", Integration geoconvention, 2013 ,pp. 1-6, Canada.

Niaghizadeh et al, "On sampling functions and fourier reconstruction methods", SEG Geophysics, vol. 75 issue (6), pp. WB137-WB151, Nov.-Dec. 2010, U.S.

Mafijul Bhuiyan, "On sampling optimization based on mutual coherency criterion", Geoconvention 2014, pp. 1-7, Canada.

Xu, et al., "Antileakage Fourier Transform for Seismic Data Regularization", Geophysics, vol. 70, No. 4, Jul.-Aug. 2005, pp. V87-V95, U.S.

Sacchi et al., "Interpolation and Extrapolation Using a High-Resolution Discrete Fourier Transform", IEEE Transactions on Signal Processing, vol. 46, No. 1, Jan. 1998, pp. 31-38, UK.

Candes et al., "Robust Uncertainty Principles: Exact Signal Reconstruction from High Incomplete Frequency Information", IEEE Transactions on Information Theory, vol. 52, pp. 489-509, Feb. 2006.

Donoho, D.L. "Compressed Sensing", IEEE Transactions on Information Theory, vol. 52, pp. 1289-1306, Apr. 2006.

Li et al., "Marine Towed Streamer Data Reconstruction Based on Compressive Sensing", SEG Expanded Abstracts 2013, pp. 3597-3602, 2013, U.S.

Mosher et al., "Increasing the efficiency of seismic data acquisition via compressive sensing", The Leading Edge, Apr. 2014, U.S.

Luo et al., "Non-uniform Acquisition Design for Foothill Environment," SEG Expanded Abstracts 2017, U.S.

Zhou et al., "Irregular seismic geometry design and data reconstruction based on compressive sensing," Geophysical Prospecting for Petroleum, vol. 56, Issue 5, Sep. 2017, CN (abstract translated).

\* cited by examiner

OPTIMIZING SOURCE AND RECEIVER LOCATIONS FOR ACQUIRING SEISMIC DATA USED IN COMPRESSIVE SENSING RECONSTRUCTION

FIELD OF THE DISCLOSURE

The present disclosure generally relates to optimizing source and receiver locations for acquiring seismic data used in compressive sensing reconstruction. More particularly, systems and methods are disclosed herein for optimizing source and receiver locations by using a minimized multi-dimensional mutual coherence map, which includes a mutual coherence value at each (x,y) location in the mutual coherence map, to determine the optimal source and receiver locations from available source and receiver locations in respective, uniformly spaced, target survey grids.

BACKGROUND

Compressive sensing is a well-known theory that has been widely published in the geophysical community since at least 2008. Compressive sensing is used in connection with seismic data acquisition and seismic data reconstruction to ultimately image the seismic data for purposes of locating hydrocarbon resources. In the field of seismic data acquisition, compressive sensing applies the well-known concept of non-uniform sampling to determine optimal shot point (hereinafter referred to as source) and sensor (hereinafter referred to as receiver) locations in respective pre-plot seismic survey designs that are used for acquiring seismic data. Non-uniform sampling exploits the sparsity of the signals sampled to optimally recover information about the formation from far fewer samples than those required by more conventional sampling techniques following the Nyquist-Shannon sampling theorem. The seismic data is non-uniformly sampled (acquired) so that normally coherent aliased energy is incoherently sampled while maintaining the coherent sampling of the desired seismic data. Compressive sensing therefore, requires a sparse representation of the seismic signals sampled in the transform domain and incoherent noise in the transform domain. Once the seismic data is acquired, it may be used with conventional compressive sensing techniques to reconstruct seismic data in unsampled locations.

Because compressive sensing can be used to reduce the number of sources and receivers required to acquire the seismic data and/or improve the resolution of a seismic data image, different techniques have been proposed to maintain a sparse representation of the seismic signals sampled and incoherent noise. One technique utilizes mutual coherence and randomized greedy algorithms, both well-known concepts, to determine an optimal sampling grid for source and receiver locations. These concepts are used together to determine an optimal sampling grid for source and receiver locations when a mutual coherence value is minimized for the optimal sampling grid. Using a single, minimized, mutual coherence value to evaluate the level of incoherence, however, may oversimplify optimization for complex surveys and lead to less accurate seismic data reconstruction results using compressive sensing techniques. Other techniques utilize misaligned sources and/or receivers to maintain a sparse (random) representation of the seismic signals sampled and incoherent noise. Such techniques, however, limit the transform domain and require local interpolation to reconstruct the seismic data in unsampled locations thus, producing less accurate seismic data reconstruction results using compressive sensing techniques.

BRIEF DESCRIPTION OF THE DRAWINGS

The present disclosure is described with reference to the accompanying drawings, in which like elements are referenced with like reference numbers, and in which.

DETAILED DESCRIPTION OF THE ILLUSTRATIVE EMBODIMENTS

Figure 1A:
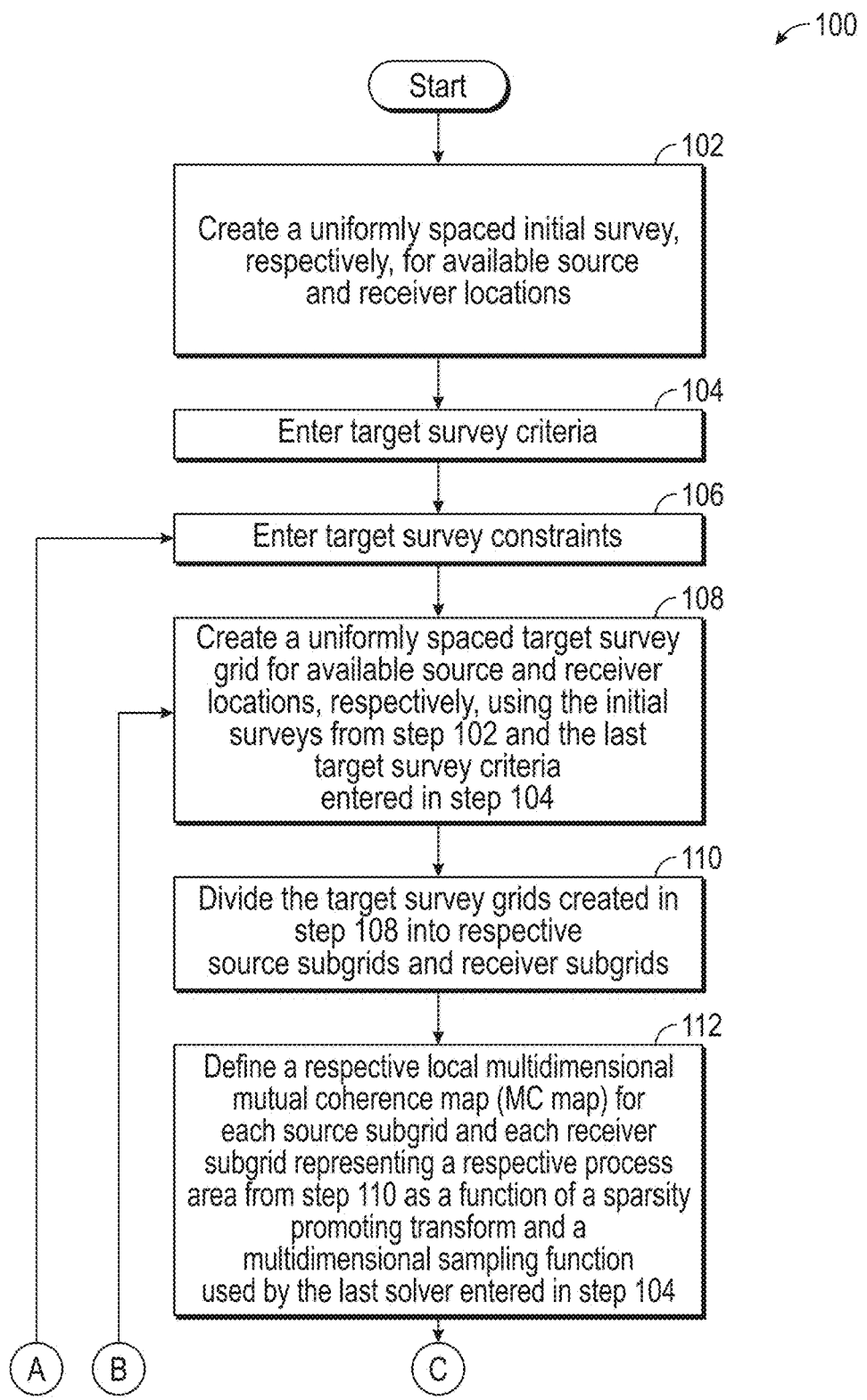
FIGS. 1A-1C are a flow diagram illustrating one embodiment of a method for implementing the present disclosure.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

In one embodiment, the present disclosure includes a method for optimizing source and receiver locations for acquiring data used in compressive sensing reconstruction, which comprises: a) creating a uniformly spaced target survey grid for available source locations and a uniformly spaced target survey grid for available receiver locations; b) dividing the target survey grid for available source locations and the target survey grid for available receiver locations into multiple source subgrids and multiple receiver subgrids, respectively; c) defining a local multidimensional mutual coherence map, representing an MC map, for each source subgrid and each receiver subgrid as a function of a sparsity promoting transform (F) and a multidimensional sampling function ($u_s$); d) solving each multidimensional sampling function for each respective source subgrid and each respective receiver subgrid using a global optimizer to iteratively minimize predetermined statistics for each respective MC map under predetermined target survey criteria and predetermined target survey constraints wherein the solution for each multidimensional sampling function determines i) local coordinates for each optimal source location in a respective source subgrid and each optimal receiver location in a respective receiver subgrid, and ii) a minimized MC map for each respective source subgrid and each respective receiver subgrid, each minimized MC map including a mutual coherence value at each (x,y) location in the minimized MC map; e) converting the local coordinates for each optimal source location and each optimal receiver location in a respective source subgrid and a respective receiver subgrid to global acquisition coordinates that each corresponds to a respective grid node on a respective source subgrid or a respective grid node on a respective receiver subgrid; and f) combining the optimal source and receiver locations in each respective source subgrid and in each respective receiver subgrid, and the corresponding minimized MC map for each respective source subgrid and each respective receiver subgrid, into a new, optimized, source survey with a combined MC map and a new, optimized, receiver survey with a combined MC map.

In another embodiment, the present invention includes a non-transitory program carrier device tangibly carrying computer-executable instructions for optimizing source and receiver locations for acquiring data used in compressive sensing reconstruction, the instructions being executable to implement; a) creating a uniformly spaced target survey grid for available source locations and a uniformly spaced target survey grid for available receiver locations; b) dividing the target survey grid for available source locations and the target survey grid for available receiver locations into multiple source subgrids and multiple receiver subgrids, respectively; c) defining a local multidimensional mutual coherence map, representing an MC map, for each source subgrid and each receiver subgrid as a function of a sparsity promoting transform (F) and a multidimensional sampling function ($u_s$); d) solving each multidimensional sampling function for each respective source subgrid and each respective receiver subgrid using a computer processor and a global optimizer to iteratively minimize predetermined statistics for each respective MC map under predetermined target survey criteria and predetermined target survey constraints wherein the solution for each multidimensional sampling function determines i) local coordinates for each optimal source location in a respective source subgrid and each optimal receiver location in a respective receiver subgrid, and ii) a minimized MC map for each respective source subgrid and each respective receiver subgrid, each minimized MC map including a mutual coherence value at each (x,y) location in the minimized MC map; e) converting the local coordinates for each optimal source location and each optimal receiver location in a respective source subgrid and a respective receiver subgrid to global acquisition coordinates that each corresponds to a respective grid node on a respective source subgrid or a respective grid node on a respective receiver subgrid; and f) combining the optimal source and receiver locations in each respective source subgrid and in each respective receiver subgrid, and the corresponding minimized MC map for each respective source subgrid and each respective receiver subgrid, into a new, optimized, source survey with a combined MC map and a new, optimized, receiver survey with a combined MC map.

In yet another embodiment, the present invention includes a method for acquiring seismic data using an optimized source survey and optimized receiver survey, which comprises: a) positioning a plurality of sources at optimal source locations in a survey area, which corresponds to the optimized source survey; b) positioning a plurality of receivers at optimal receiver locations in the survey area, which corresponds to the optimized receiver survey; c) transmitting seismic energy from each of the plurality of sources into a formation defined by the survey area; d) recording at least one of reflected and refracted seismic data with one or more of the plurality of receivers; e) wherein each optimal source location corresponds to a respective grid node on the optimized source survey and each optimal receiver location corresponds to a respective grid node on the optimized receiver survey; and f) wherein the optimal source locations are based on a plurality of mutual coherence values and the optimal receiver locations are based on a plurality of mutual coherence values.

The systems and methods of the present disclosure overcome one or more of the prior art disadvantages by optimizing source and receiver locations using a minimized multidimensional mutual coherence map, which includes a mutual coherence value at each (x,y) location in the mutual coherence map, to determine the optimal source and receiver locations from available source and receiver locations in respective, uniformly spaced, target survey grids.

Figure 1B:
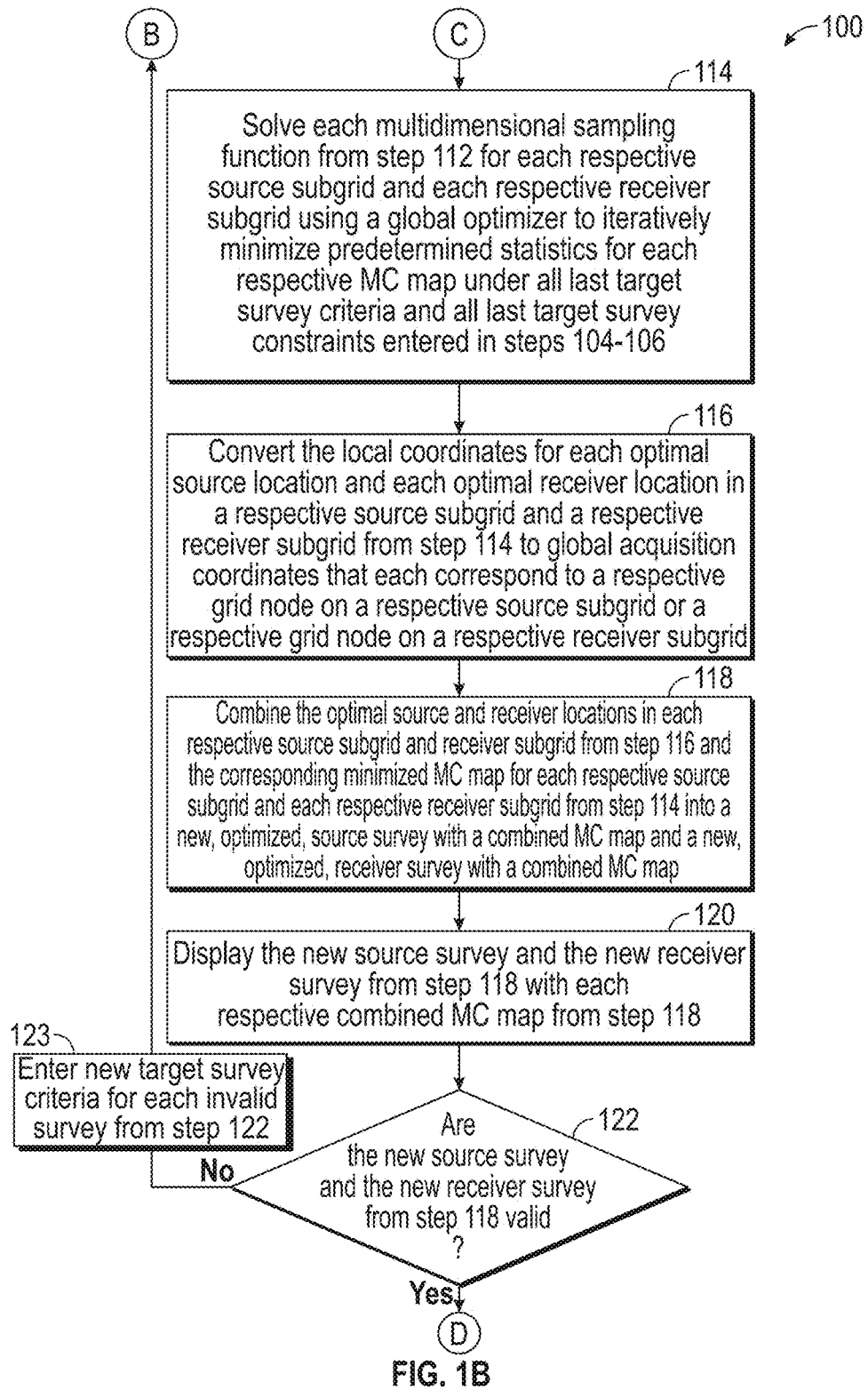
Figure 1C:
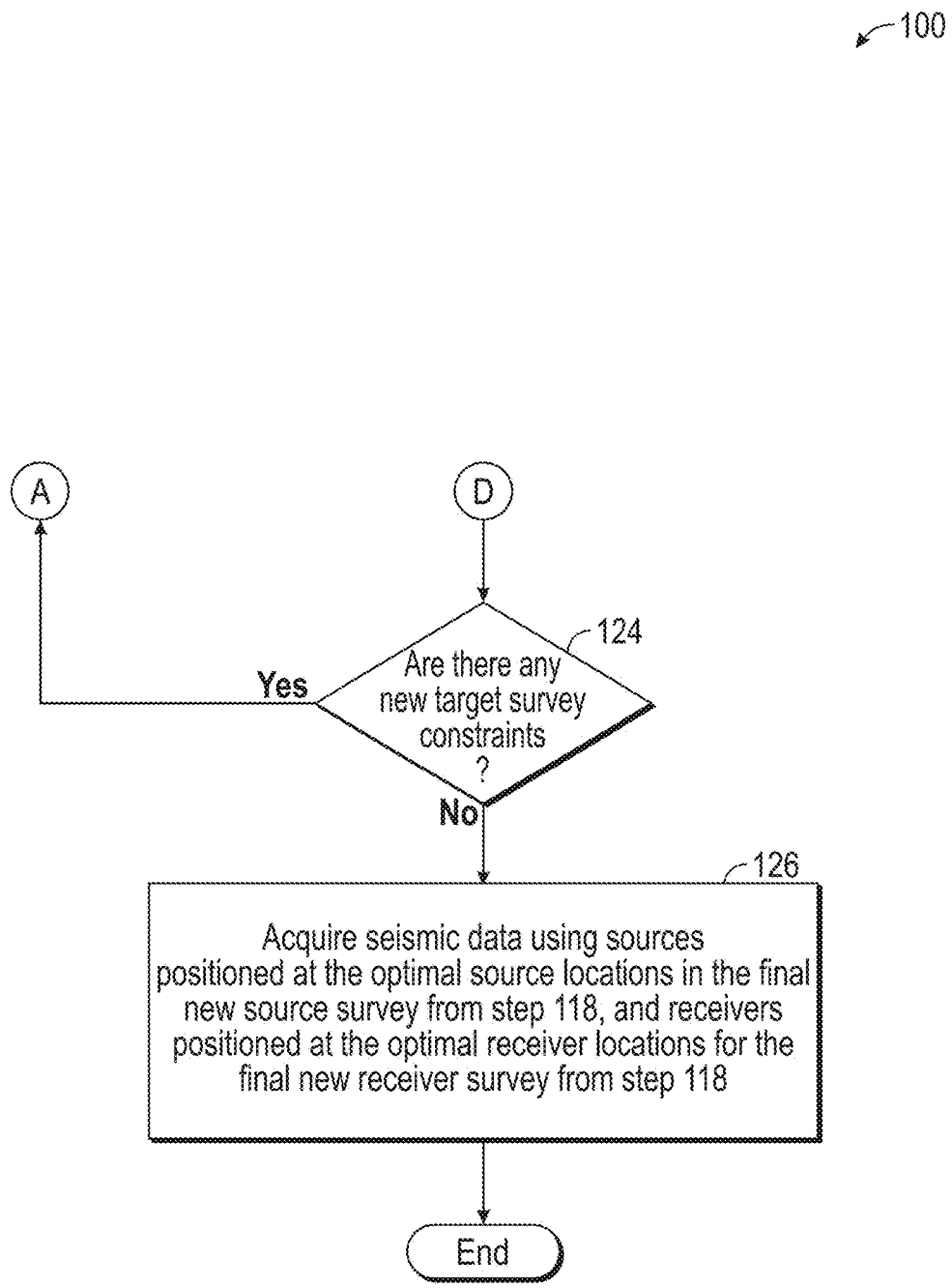

Referring now to FIGS. 1A-1C, a flow diagram illustrates one embodiment of a method 100 for implementing the present disclosure. The method 100 may be used for designing pre-plot seismic surveys that will reduce the cost of acquiring seismic data or improve the image resolution of the seismic data acquired.

Figure 2:
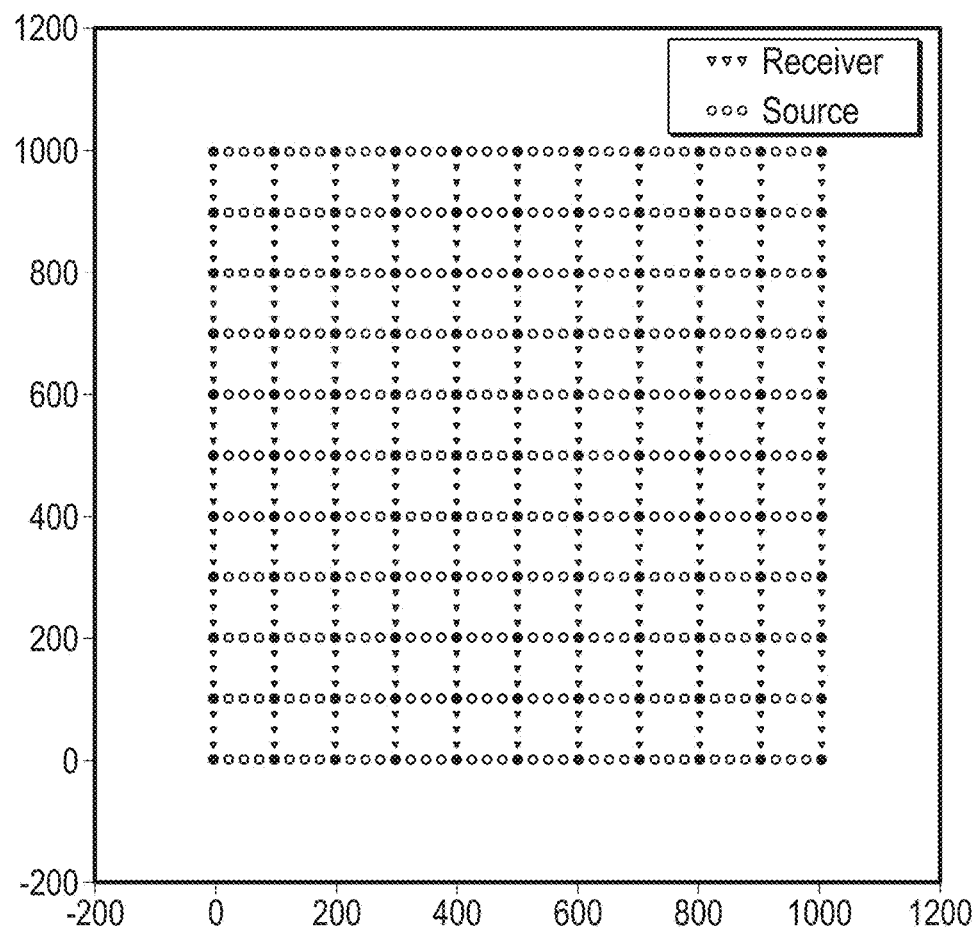
FIG. 2 is a schematic plan view of initial surveys created according to step 102 in FIG. 1A illustrating a conventional arrangement of available source and receiver locations in a grid.

In step 102, a uniformly spaced initial survey is created, respectively, for available source and receiver locations using conventional criteria (e.g. anticipated survey cost, a geological subsurface model, illumination, bin size, fold, imaged target location, and anticipated signal-to-noise ratio), and any well-known seismic survey design software such as, for example, OMNI 3D seismic survey design software available from Schlumberger. A schematic plan view of initial surveys illustrating a conventional arrangement of available source and receiver locations according to this step is illustrated in FIG. 2. The initial survey for the sources (circles) overlays the initial survey for the receivers (triangles), which are each uniformly spaced in uniformly spaced orthogonal lines forming a respective grid over a portion of a survey area. Typically, each initial survey created for the available source and receiver locations forms a respective grid over the entire survey area. The initial survey grids may be slightly offset to avoid identical available source and receiver locations.

Figure 15:
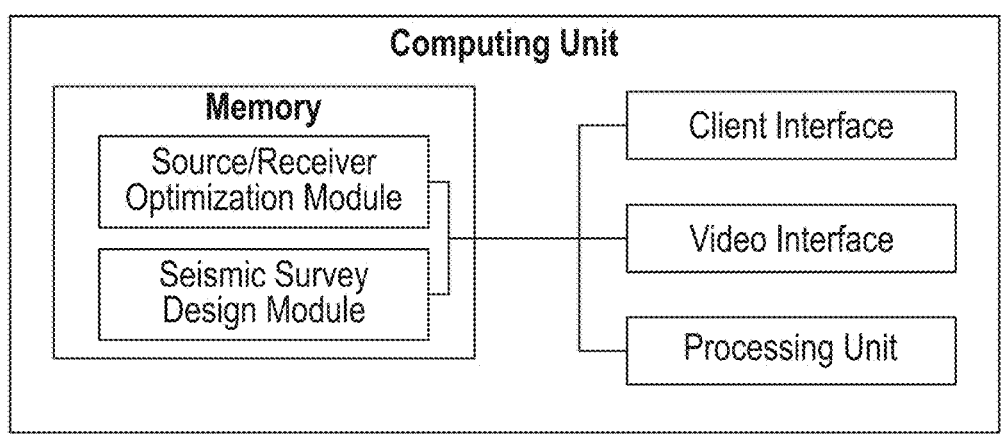
FIG. 15 is a block diagram illustrating one embodiment of a computer system for implementing the present disclosure.

In step 104, target survey criteria are entered using the client interface, the video interface and/or the GUI described further in reference to FIG. 15. The target survey criteria include, for example, anticipated survey cost, desired image resolution, fold, domain, solver, under sampling rate, and bin size; however, may also include seismic data acquisition schedules, geological subsurface models, illumination, imaged target location, and anticipated signal-to-noise ratio. The domain is preferably a source XY, receiver XY domain; however, may be a i) a common midpoint (CMP), offset XY domain; or ii) a CMP offset, azimuths domain. The number of process areas for each domain is typically different and predefined as a starting point. The solver may be any well-known solver such as, for example, an EPOCS™ solver available from In-Depth Compressive Seismic, Inc. The target survey criteria may be determined, for example, by balancing the anticipated survey cost and desired image resolution for the final new survey used in step 126 compared to the anticipated survey cost and desired image resolution for the initial survey created in step 102.

In step 106, target survey constraints are entered using the client interface, the video interface and/or the GUI described further in reference to FIG. 15. The target survey constraints may include survey area constraints such as terrain, obstacles, and permit requirements. The target survey constraints may also include other survey constraints such as source and receiver spacing requirements, fixed source and receiver locations, in-line or cross-line direction requirements, minimum temporal and spatial distance requirements between overlap sources and offsetting requirements. The target survey constraints are used to confirm that the final (proposed) source and receiver locations are available in the physical survey area and meet any other survey constraints.

In step 108, a uniformly spaced target survey grid is created, respectively, for available source and receiver locations using the initial surveys from step 102 for the entire survey area and the last target survey criteria entered in step 104. The target survey grids each include grid nodes that represent the available source and receiver locations, which cover the entire survey area and may be slightly offset to avoid identical source and receiver locations. If the anticipated survey cost is emphasized as a primary criterion, then the initial surveys created in step 102 could be used as respective target survey grids to limit the possible source and receiver locations. If, however, the desired image resolution is emphasized as a primary criterion, then target survey grids with more respective source and receiver locations than the initial surveys would be required.

Figure 3:
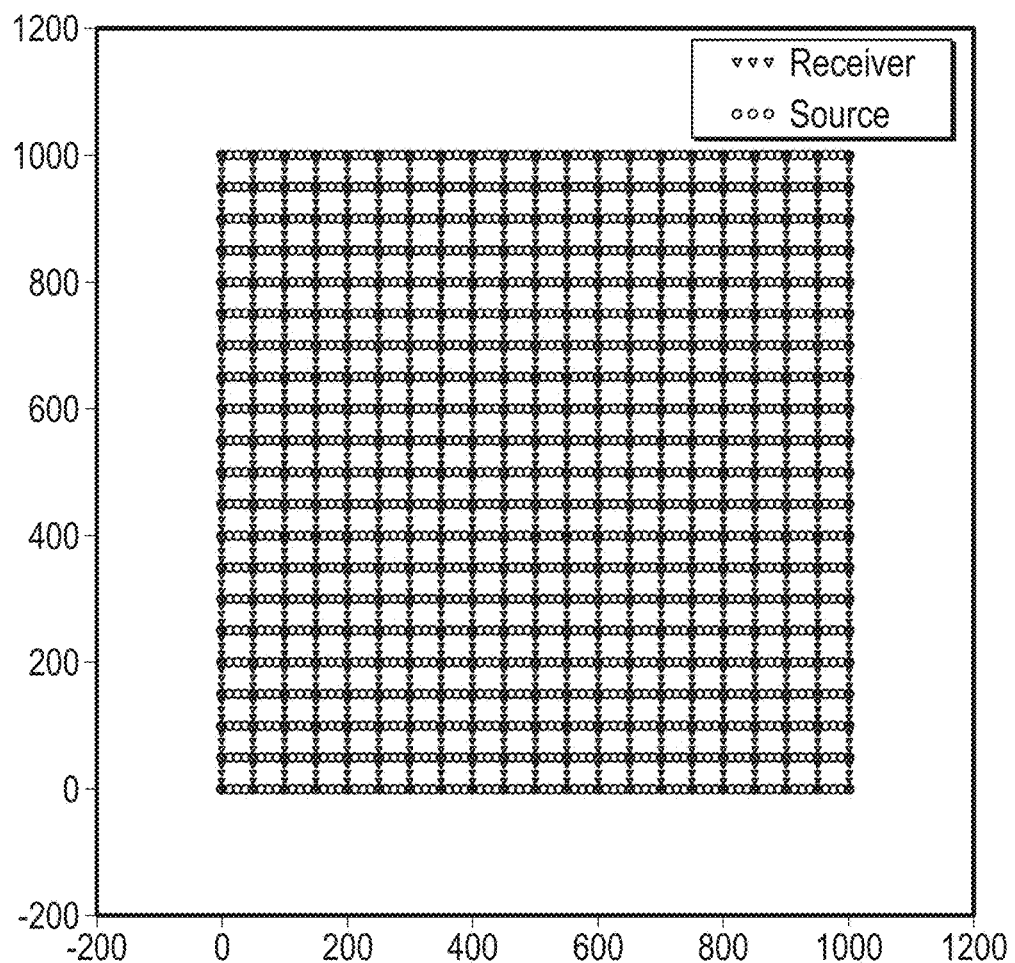
FIG. 3 is a schematic plan view of source and receiver subgrids illustrating one arrangement of available source and receiver locations in target survey grids that were divided according to step 110 in FIG. 1A.
Figure 4:
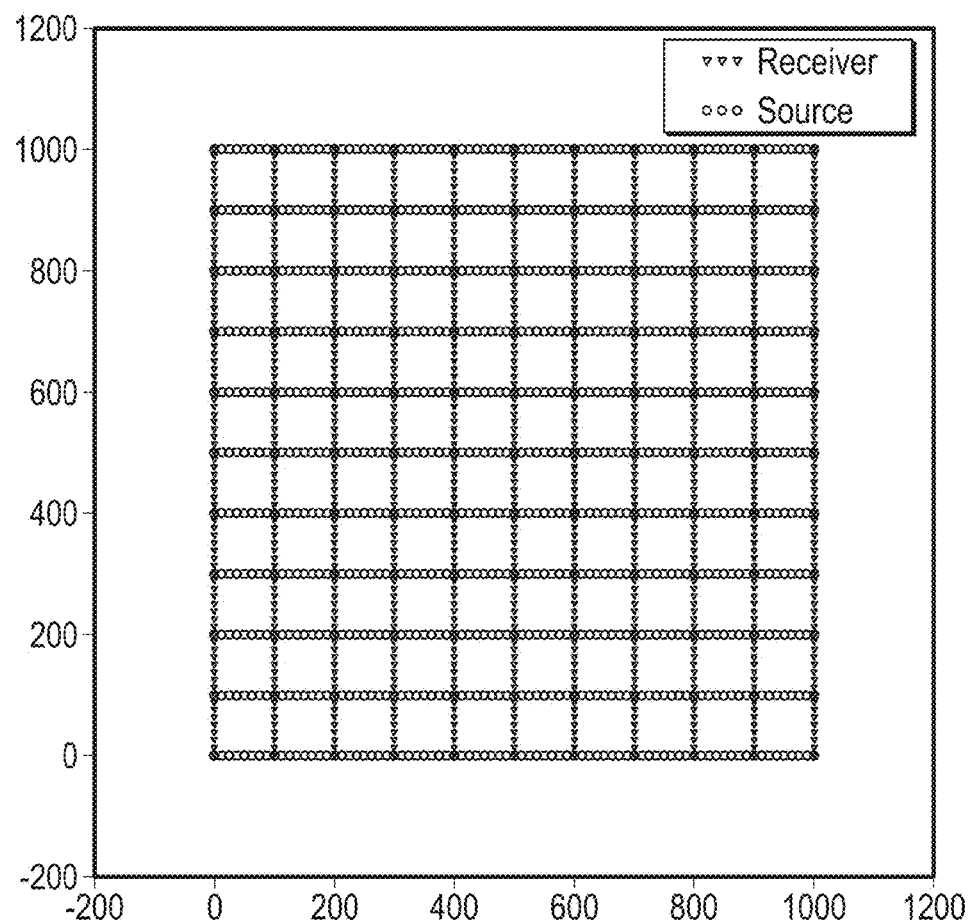
FIG. 4 is a schematic plan view of source and receiver subgrids illustrating another arrangement of available source and receiver locations in target survey grids that were divided according to step 110 in FIG. 1A.
Figure 5:
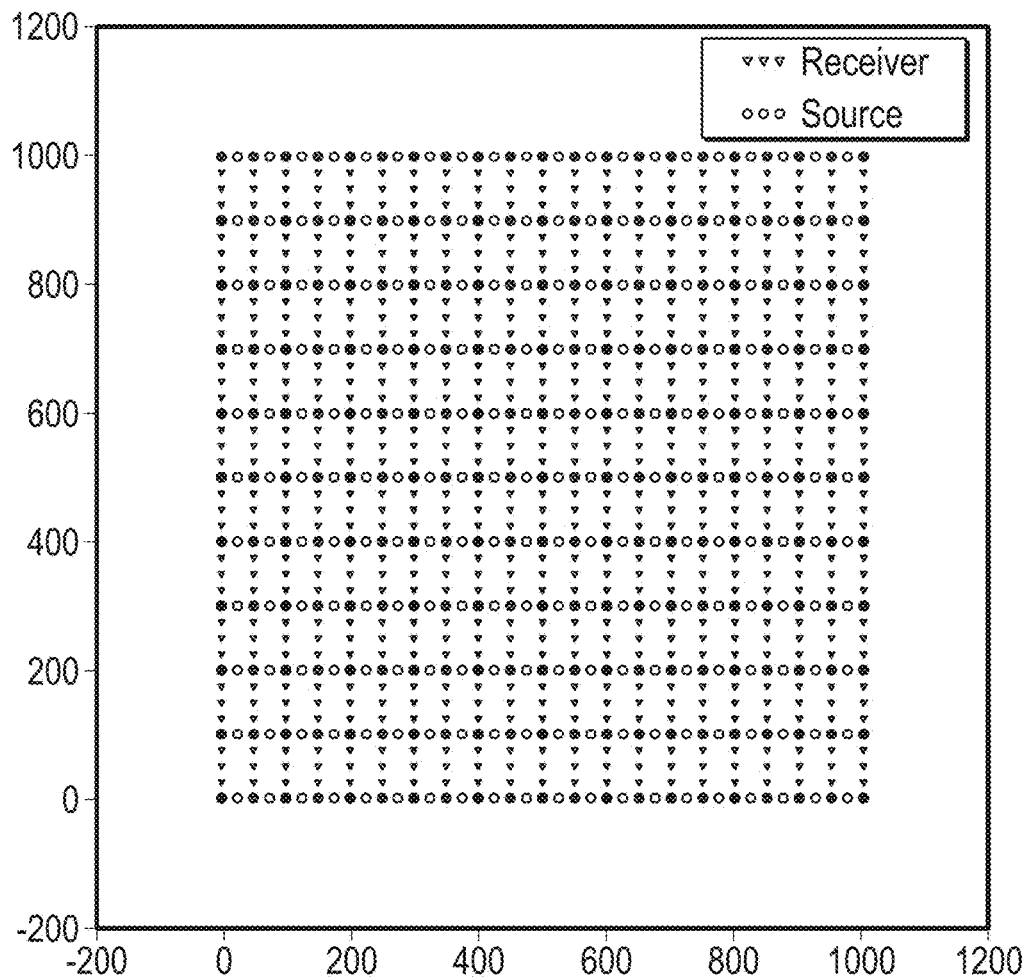
FIG. 5 is a schematic plan view of source and receiver subgrids illustrating yet another arrangement of available source and receiver locations in target survey grids that were divided according to step 110 in FIG. 1A.
Figure 6:
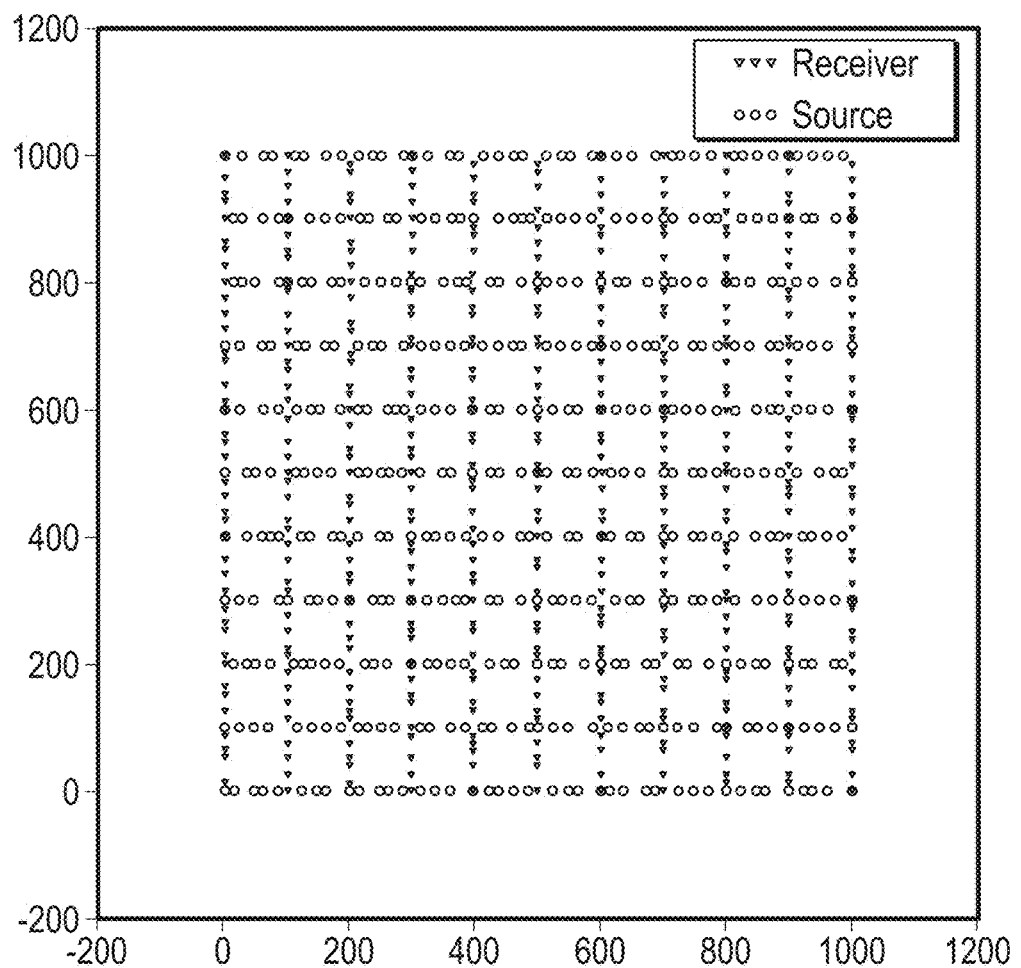
FIG. 6 is a schematic plan view of source and receiver subgrids illustrating an arrangement of optimal source and receiver locations based on the available source and receiver locations in FIG. 4 and steps 114-116 in FIG. 1B.
Figure 7:
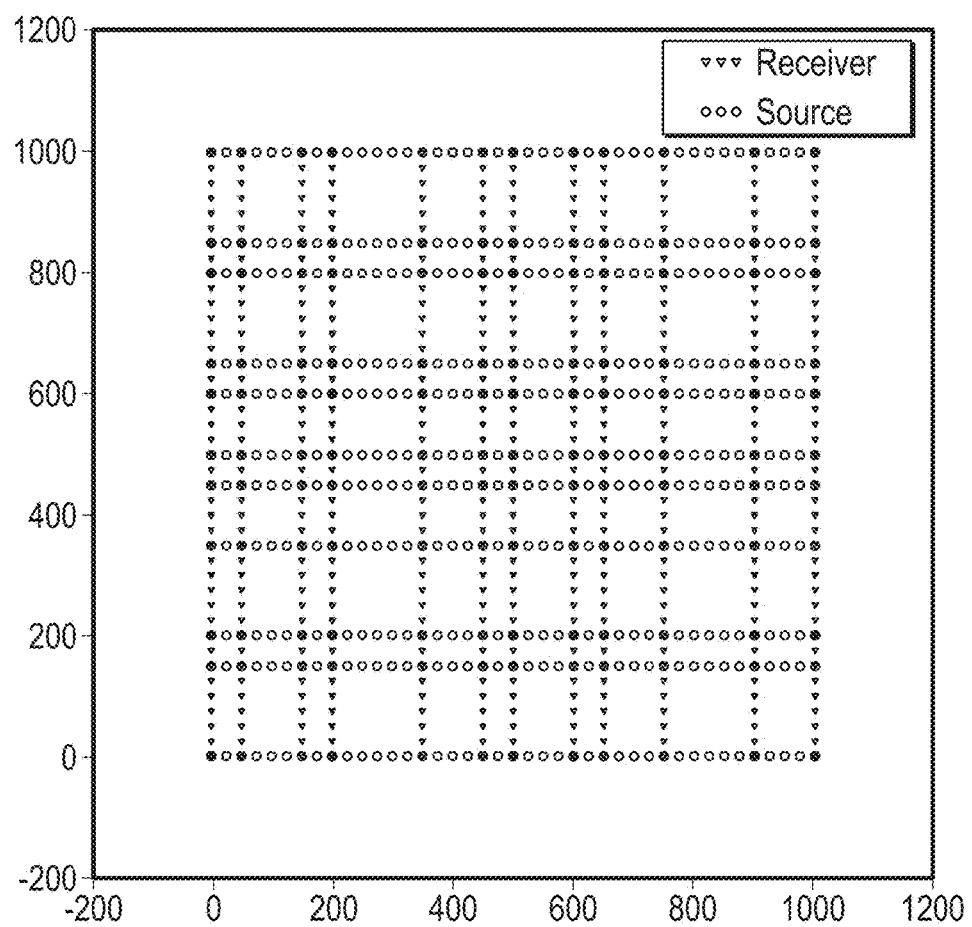
FIG. 7 is a schematic plan view of source and receiver subgrids illustrating an arrangement of optimal source and receiver locations based on the available source and receiver locations in FIG. 5 and steps 114-116 in FIG. 1B.
Figure 8:
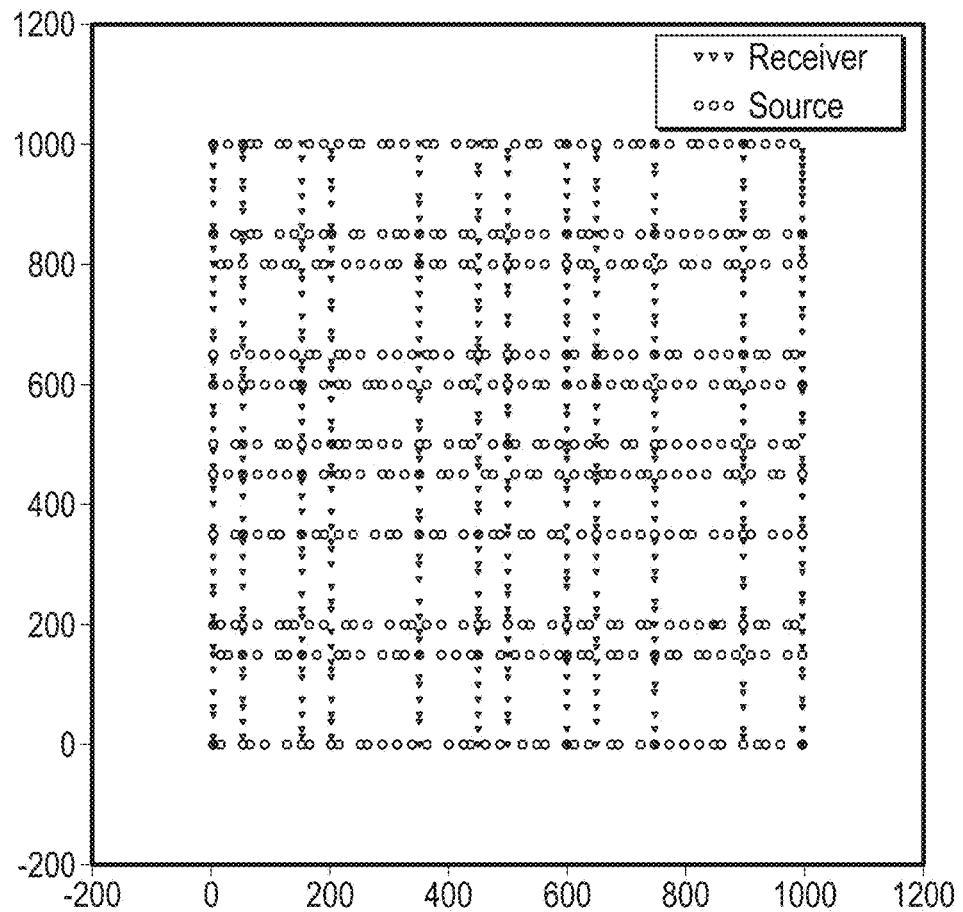
FIG. 8 is a schematic plan view of source and receiver subgrids illustrating an arrangement of optimal source and receiver locations based on the available source and receiver locations in FIG. 3 and steps 114-116 in FIG. 1B.

In step 110, the target survey grids created in step 108 are respectively divided into source subgrids and receiver subgrids wherein the number of source subgrids and the number of receiver subgrids each represents the same number of process areas used for the last domain entered in step 104. Optionally, the target survey grids created in step 108 may be respectively divided into source subgrids and receiver subgrids wherein the number of source subgrids and the number of receiver subgrids each represents a different predefined number of process areas. The target survey grids are divided into multiple process areas forming subgrids in order to improve the accuracy and speed of implementing the method 100 on a computer processor. The subgrids in FIGS. 3-5 illustrate schematic plan views of exemplary available source and receiver locations in target survey grids that were divided according to this step. Each subgrid for the sources (circles) in FIGS. 3-5 overlays a respective subgrid for the receivers (triangles), which are each uniformly spaced in uniformly spaced orthogonal lines over the same survey area in FIG. 2 for comparison. Although not depicted by the subgrids in FIGS. 3-5, they are typically separated and offset according to the description of step 108. As demonstrated by a comparison of each overlaid subgrid in FIGS. 3-5 with each overlaid initial survey grid in FIG. 2, there are more available source and receiver locations in the subgrids-which is preferred. Because the initial surveys created in step 102 typically form a respective grid over the entire survey area, each subgrid created by this step typically covers an area smaller than the entire survey area.

In step 112, a local multidimensional mutual coherence map (MC map) is respectively defined for each source subgrid and each receiver subgrid representing a respective process area from step 110 as a function of a sparsity promoting transform (F) and a multidimensional sampling function ($u_s$) used by the last solver entered in step 104. A domain coefficient (Us) is equal to the sparsity promoting transform (F) multiplied by the multidimensional sampling function ($u_s$); and wherein $$MC(x, y) = \frac{\max \|Us'\|}{\max \|Us\|}, \|U'_s\| < \max \|U_s\|, U'_s \in U_s$$

defines the MC map. An MC map is thus, defined for the available source locations in each subgrid representing a process area and for the available receiver locations in each subgrid representing a process area. Each MC map represents the mutual coherence (alias energy) at each (x,y) location in the MC map.

In step 114, each multidimensional sampling function ($u_s$) from step 112 is solved for each respective source subgrid and each respective receiver subgrid using a global optimizer to iteratively minimize predetermined statistics for each respective MC map (e.g. maximum value, mean value, standard deviation, etc. . . . ) under all last target survey criteria and all last target survey constraints entered in steps 104-106. By solving for each multidimensional sampling function ($u_s$) from step 112, a location value (0 or 1) is determined at each local coordinate (x,y) in a process area that corresponds to a grid node on a respective source subgrid and a grid node on respective receiver subgrid. Each local coordinate in a process area therefore, is associated with a source location value or a receiver location value. Each location value represents an optimal location (e.g. "1") or no location (e.g. "0") for a source or a receiver. By solving for each multidimensional sampling function ($u_s$) from step 112, a mutual coherence value is also determined at each (x,y) location in the MC map defined for each respective source subgrid and each respective receiver subgrid. Each MC map thus, includes mutual coherence values, which collectively represent a minimized MC map for each process area. In this manner, the optimal location (local coordinates) of each source and each receiver in a respective source subgrid and a respective receiver subgrid is determined when the respective MC map is minimized.

Figure 9:
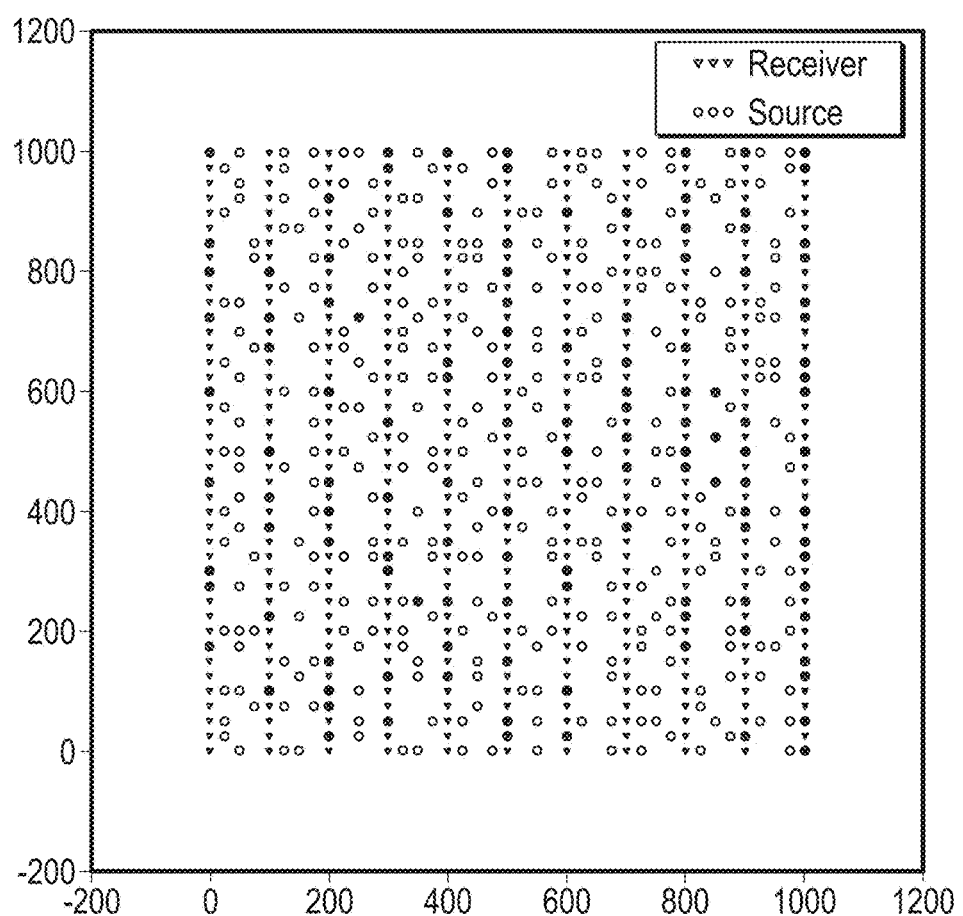
FIG. 9 is a schematic plan view of source and receiver subgrids illustrating one arrangement of optimal source and receiver locations based on the available source and receiver locations in the respective subgrids from step 110 in FIG. 1A and steps 114-116 in FIG. 1B.
Figure 10:
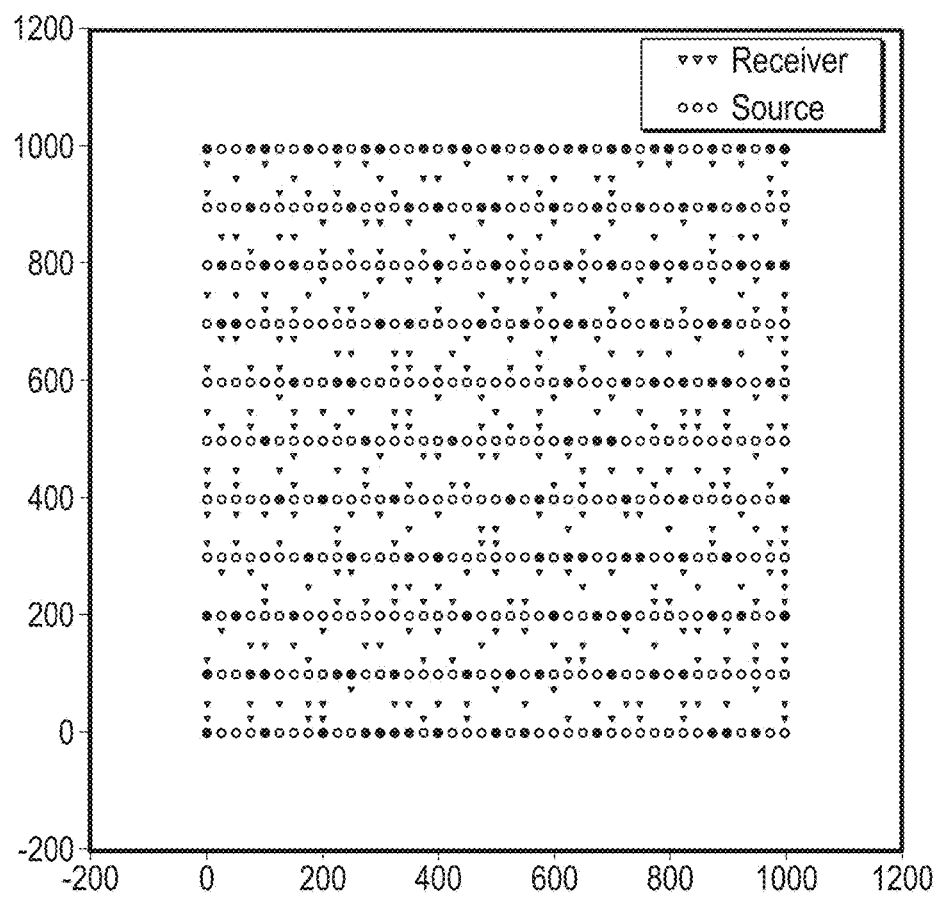
FIG. 10 is a schematic plan view of source and receiver subgrids illustrating another arrangement of optimal source and receiver locations based on the available source and receiver locations in the respective subgrids from step 110 in FIG. 1A and steps 114-116 in FIG. 1B.
Figure 11:
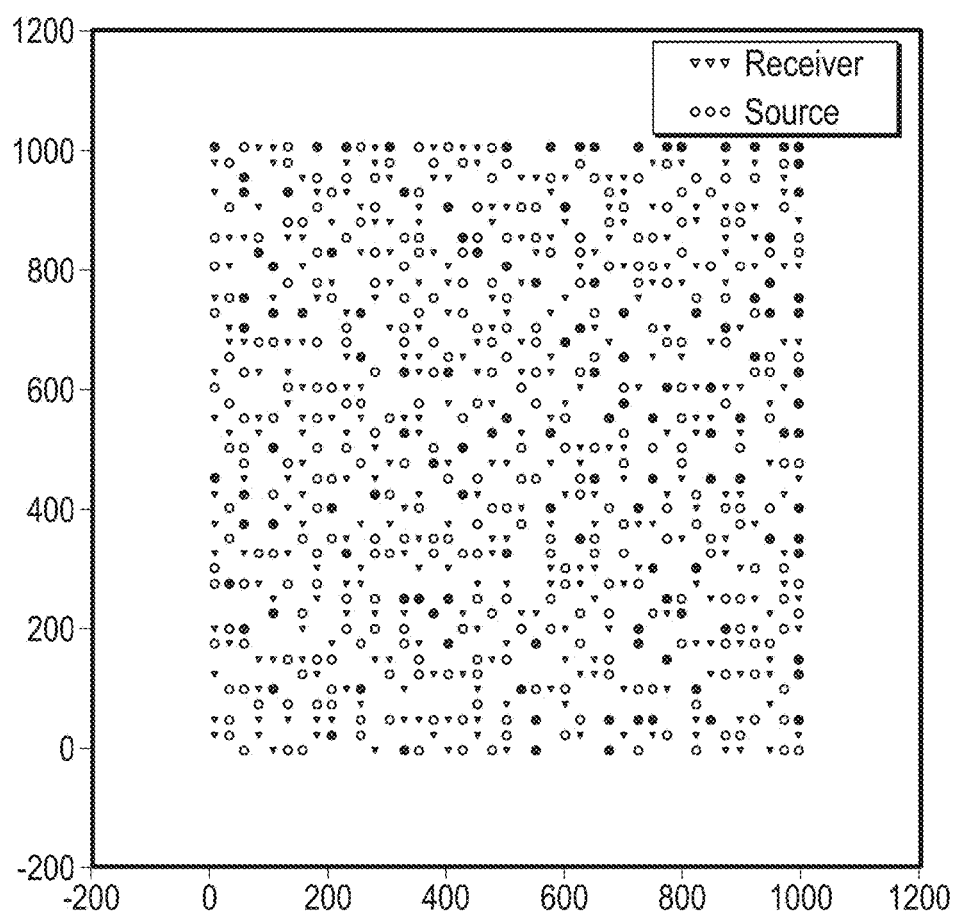
FIG. 11 is a schematic plan view of source and receiver subgrids illustrating yet another arrangement of optimal source and receiver locations based on the available source and receiver locations in the respective subgrids from step 110 in FIG. 1A and steps 114-116 in FIG. 1B.

In step 116, the local coordinates for each optimal source location and each optimal receiver location in a respective source subgrid and a respective receiver subgrid from step 114 are converted to global acquisition coordinates that each correspond to a respective grid node on a respective source subgrid or a respective grid node on respective receiver subgrid. The subgrids in FIGS. 6-11 illustrate schematic plan views of exemplary optimal source and receiver locations after converting their local coordinates to global acquisition coordinates according to this step. Each subgrid for the sources (circles) in FIGS. 6-11 overlays a respective subgrid for the receivers (triangles), which are each regularly indexed (in-line and cross-line) as a result of steps 114-116 to accommodate most types of solvers used. Regularly indexed means that the spacing between optimal source and receiver locations (in-line and cross-line) could be uniform or non-uniform and that the source and receiver locations are always positioned on a grid node of a respective subgrid. Because the optimal source and receiver locations are regularly indexed, they are aligned both in-line and cross-line. Although not depicted by the overlaid subgrids in FIGS. 6-11, they are typically separated and offset according to the description of step 108. The subgrids in FIG. 4 were used to create the subgrids in FIG. 6, which illustrate a one-dimensional, non-uniformly spaced, in-line pattern for optimal source and receiver locations. The subgrids in FIG. 5 were used to create the subgrids in FIG. 7, which illustrate a one-dimensional, non-uniformly spaced, cross-line pattern for optimal source and receiver locations. The subgrids in FIG. 3 were used to create the subgrids in FIG. 8, which illustrate a one-dimensional, non-uniformly spaced, in-line and cross-line pattern for optimal source and receiver locations. The subgrids in FIG. 9 illustrate a two-dimensional, non-uniformly spaced, in-line and cross-line pattern for optimal source locations wherein the optimal receiver locations are the same as the available receiver locations on the corresponding receiver subgrid used from step 110 to create the receiver subgrid in FIG. 9. The subgrids in FIG. 10 illustrate a two-dimensional, non-uniformly spaced, in-line and cross-line pattern for optimal receiver locations wherein the optimal source locations are the same as the available source locations on the corresponding source subgrid used from step 110 to create the source subgrid in FIG. 9. The subgrids in FIG. 11 illustrate a two-dimensional, non-uniformly spaced, in-line and cross-line pattern for optimal receiver locations and optimal source locations. As demonstrated by a comparison of each overlaid subgrid in FIGS. 6-8 with each respective overlaid subgrid in FIGS. 4, 5 and 3, there are fewer optimal source and receiver locations than available source and receiver locations due to acquisition costs.

In step 118, the optimal source and receiver locations in each respective source subgrid and receiver subgrid from step 116 and the corresponding minimized MC map for each respective source subgrid and each respective receiver subgrid from step 114 are combined into a new, optimized, source survey with a combined MC map and a new, optimized, receiver survey with a combined MC map.

Figure 12A:
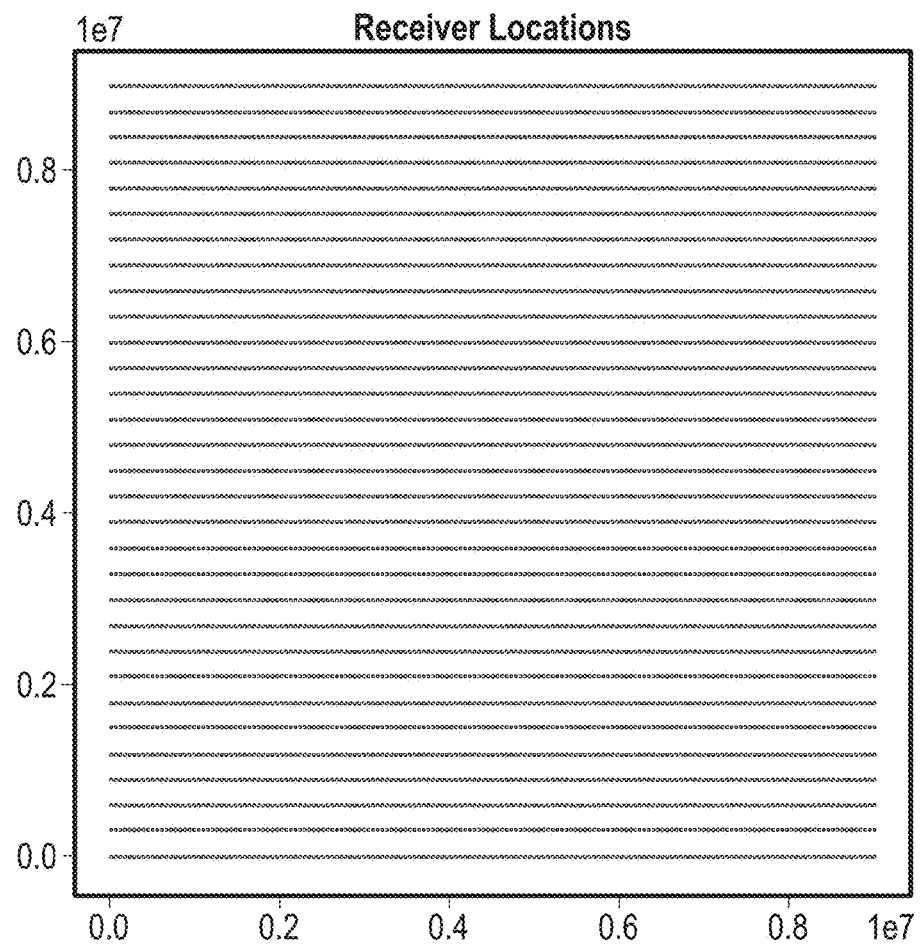
FIGS. 12A-12B are schematic plan views of seismic survey designs illustrating an arrangement of available source and receiver locations in a conventional source survey (12B) and a conventional receiver survey (12A).
Figure 12B:
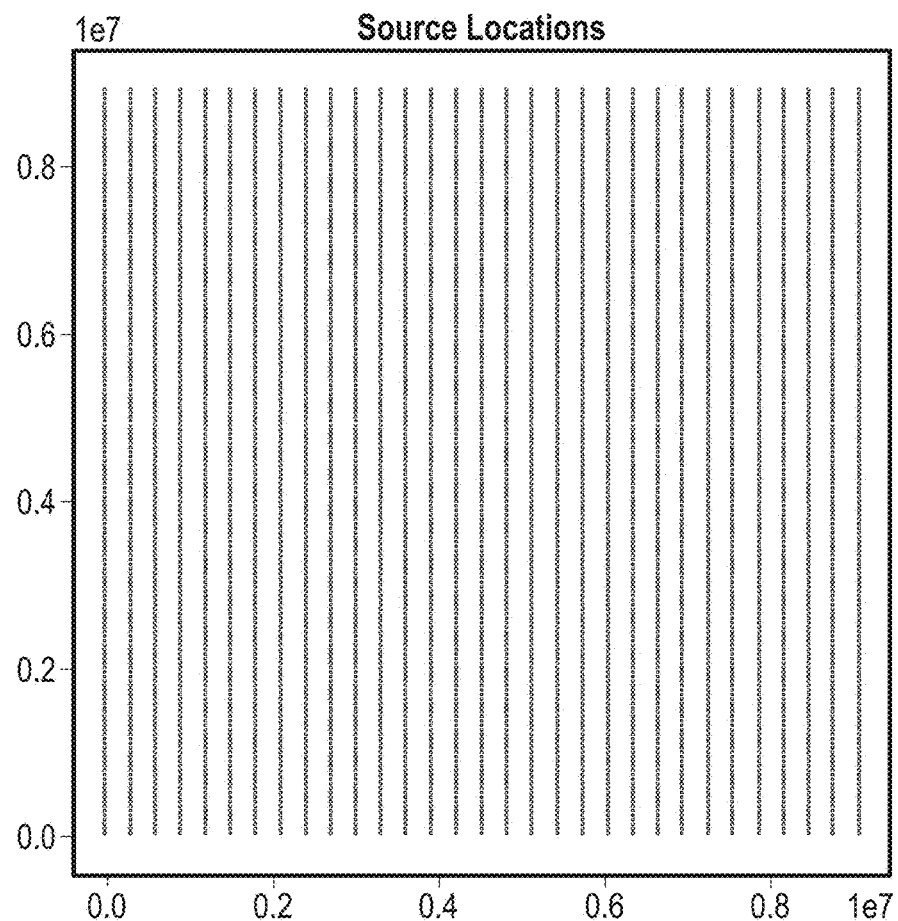
Figure 13A:
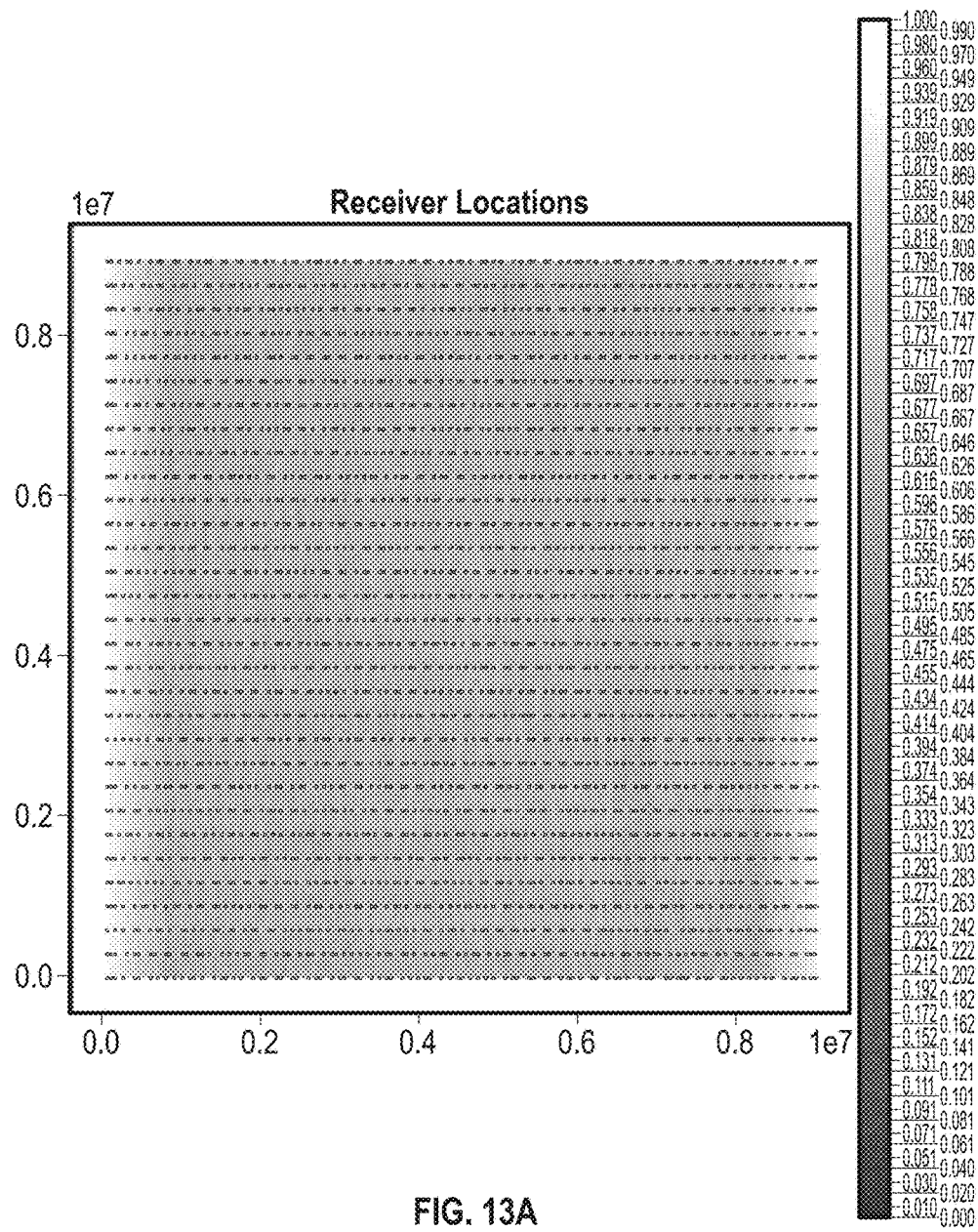
FIGS. 13A-13B are schematic plan views of pre-plot seismic survey designs combined according to step 118 of FIG. 1B illustrating cost-based arrangements of optimal source and receiver locations in a new source survey (13B) and a new receiver survey (13A) with respective combined MC maps.
Figure 13B:
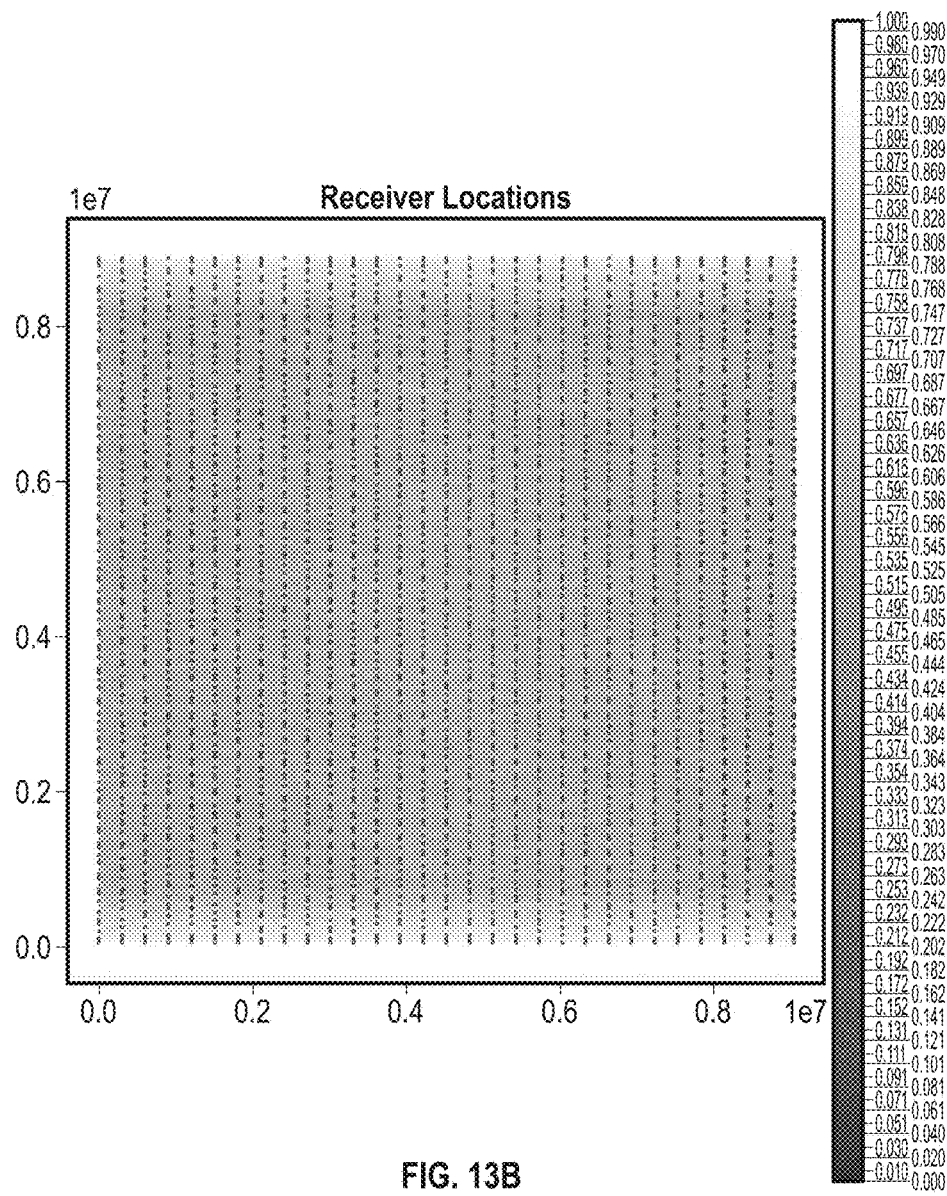
Figure 14A:
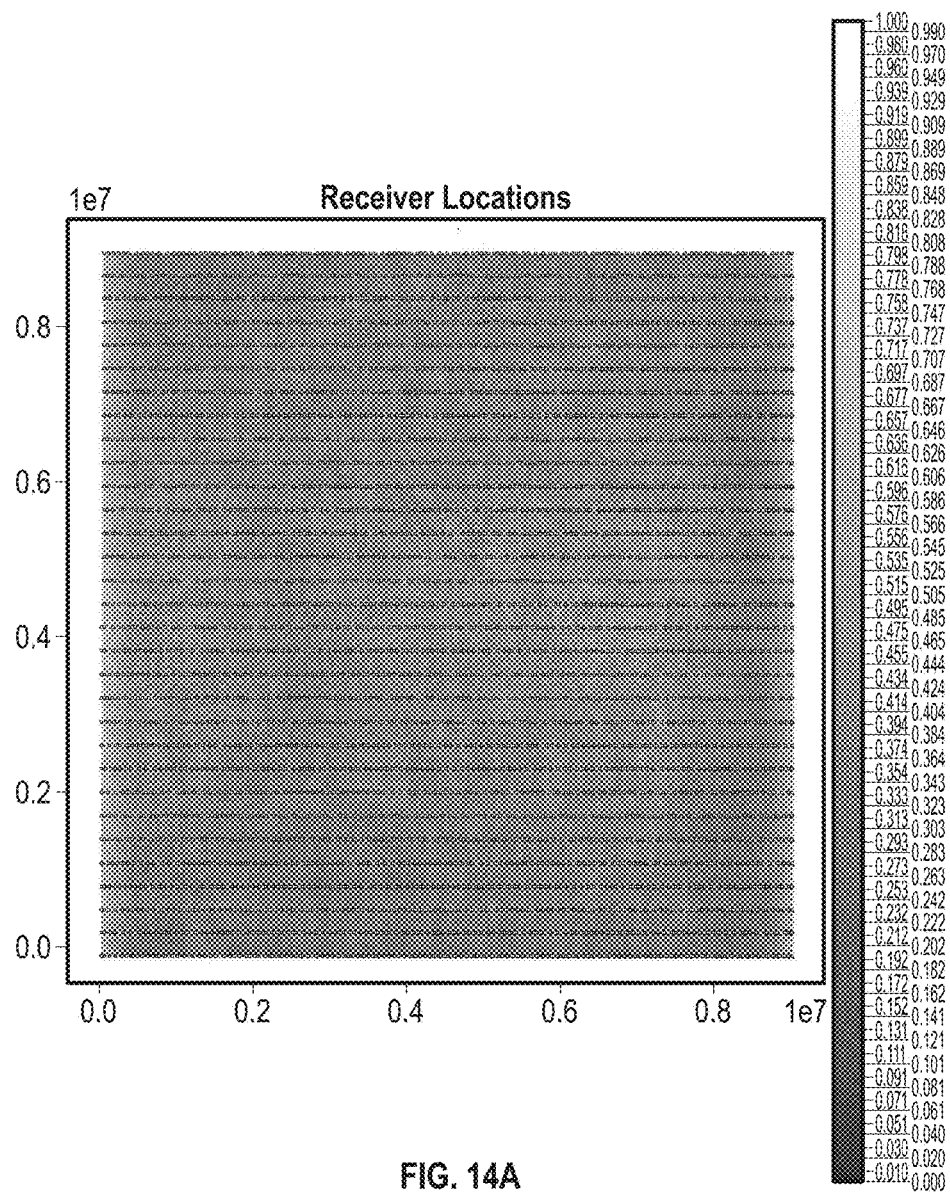
FIGS. 14A-14B are schematic plan views of pre-plot seismic survey designs combined according to step 118 of FIG. 1B illustrating resolution-based arrangements of optimal source and receiver locations in a new source survey (14B) and a new receiver survey (14A) with respective combined MC maps.
Figure 14B:
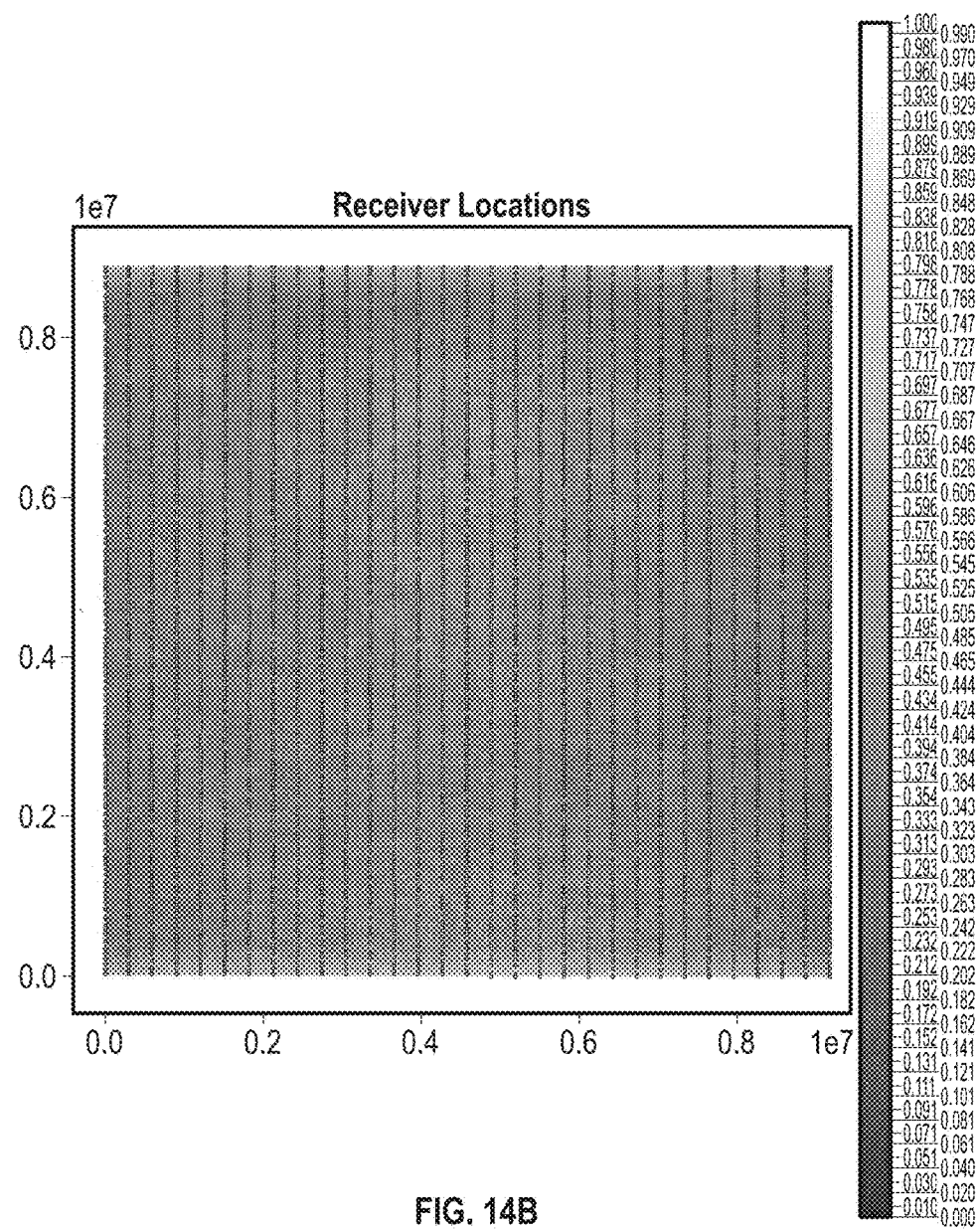

In step 120, the new source survey and the new receiver survey from step 118 are displayed with each respective combined MC map from step 118 using the client interface, the video interface and/or the GUI described further in reference to FIG. 15. The seismic survey designs in FIGS. 12A-12B illustrate schematic plan views of available source and receiver locations in a conventional source survey (12B) and receiver survey (12A). The seismic survey designs in FIGS. 12A-12B represent a base case (for comparison). The pre-plot seismic survey designs in FIGS. 13A-13B illustrate schematic plan views of an exemplary new source survey (13B) and new receiver survey (13A) displayed with each respective combined MC map (greyscale) according to step 118. The pre-plot seismic survey designs in FIGS. 13A-13B represent a cost case, wherein the optimal source and receiver locations are fewer than the receiver and source locations on the seismic survey designs in FIGS. 12A-12B, respectively. Use of the pre-plot seismic survey designs in FIGS. 13A-13B to acquire seismic data will thus, reduce the cost compared to use of the seismic survey designs in FIGS. 12A-12B because fewer sources and receivers are required. In addition, use of the pre-plot seismic survey designs in FIGS. 13A-13B to acquire seismic data will produce a resolution comparable to the resolution produced by use of the seismic survey designs in FIGS. 12A-12B. The pre-plot seismic survey designs in FIGS. 14A-14B illustrate schematic plan views of an exemplary new source survey (14B) and new receiver survey (14A) displayed with each respective combined MC map (greyscale) according to step 118. The pre-plot seismic survey designs in FIGS. 14A-14B represent a resolution case, wherein the optimal source and receiver locations are greater than the receiver and source locations on the seismic survey designs in FIGS. 12A-12B, respectively. Use of the pre-plot seismic survey designs in FIGS. 14A-14B to acquire seismic data will thus, increase the cost but produce a better resolution compared to use of the seismic survey designs in FIGS. 12A-12B.

In step 122, the method 100 determines if the new source survey and the new receiver survey from step 118 are valid based on the display of each respective combined MC map from step 120. The display of each respective combined MC map includes gray scale or color coded mutual coherence values at each (x,y) location in the combined MC map. Low mutual coherence values indicate a valid new source survey and/or a valid new receiver survey-meaning that sampling is sufficiently non-uniform in distance. Conversely, high mutual coherence values indicate an invalid new source survey and/or an invalid new receiver survey-suggesting that the sampling is approaching an undesirable uniform distance. The display of the combined MC map with each respective pre-plot seismic survey design in FIGS. 13A-13B confirms low mutual coherence values at the optimal source and receiver locations-meaning that sampling is sufficiently non-uniform. The pre-plot seismic survey designs in FIGS. 13A-13B therefore, are valid. If the new source survey and/or the new receiver survey are not valid, then the method 100 proceeds to step 123. Otherwise, the method 100 proceeds to step 124 for each valid survey.

In step 123, new target survey criteria are entered for each invalid survey using the client interface, the video interface and/or the GUI described further in reference to FIG. 15. The method 100 then returns to step 108 and repeats steps 108-122 for each invalid survey.

In step 124, the method 100 determines whether there are any new target survey constraints. If there are new target survey constraints, then the method 100 returns to step 106. Otherwise, the method 100 proceeds to step 126. Because the target survey constraints may change prior to seismic data acquisition in step 126, new target survey constraints may be entered at step 106, in real-time, and steps 108-124 repeated for each valid survey, until there are no more new target survey constraints. If there are no more new target survey constraints and the surveys from step 118 are confirmed valid in step 122, then the surveys from step 118 represent the final new source survey and the final new receiver survey.

In step 126, seismic data is acquired using sources positioned at the optimal source locations in the final new source survey from step 118, receivers positioned at the optimal receiver locations in the final new receiver survey from step 118 and conventional seismic data acquisition techniques. Once the seismic data is acquired, it may be used with any suitable compressive sensing technique to reconstruct seismic data back to each grid node on the target survey grid created for available receiver locations in step 108.

The method 100 thus, optimizes source and receiver locations in seismic survey designs using mutual coherence values at each (x,y) location in the MC map instead of a single mutual coherence value for the entire sampling grid. And, because the method 100 produces regularly indexed optimal source and receiver locations, the transform domain is not limited. The method 100 therefore, may be used to optimize source and receiver locations in complex seismic survey designs without compromising seismic data reconstruction results.

The method 100 optimizes source and receiver locations in seismic survey designs that may be used for both acquiring seismic data on land (on-shore) and in a marine environment (off-shore). For off-shore seismic survey designs, the receivers on the towed streamers and sources (air guns or water guns) are statically positioned, relative to themselves, on a respective local grid and are attached to the towing vessel(s). For off-shore seismic survey designs used on the ocean bottom, the nodes (receivers) are statically positioned, relative to themselves, on a respective local grid on the ocean bottom and the sources (air guns, or water guns) are statically positioned, relative to themselves, on a respective local grid attached to the towing vessel(s). In both off-shore cases, the sources and receivers are regularly indexed.

The present disclosure may be implemented through a computer-executable program of instructions, such as program modules, generally referred to as software applications or application programs executed by a computer. The software may include, for example, routines, programs, objects, components and data structures that perform particular tasks or implement particular data types. The software forms an interface to allow a computer to react according to a source of input. The software may also cooperate with other code segments to initiate a variety of tasks in response to data received. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 15, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described and illustrated herein. The memory therefore, includes a source/receiver optimization module, which enables steps 104-126 described in reference to FIGS. 1A-1C. The source/receiver optimization module may integrate functionality from the seismic survey design module illustrated in FIG. 15. In particular, the seismic survey design module may be used to perform step 102 described in reference to FIG. 1A.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random-access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus but may be connected by other interface and bus structures, such as a parallel port or a universal serial bus (USB).

A monitor or other type of display device may be connected to the system bus via an interface, such as a video interface. A GUI may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. For example, the present disclosure has been described with respect to optimizing source and receiver locations in seismic survey designs that may be used for acquiring seismic data, however, it is not limited thereto and may also be applied in other industries (e.g. medical imaging) to acquire different data provided there is a source, one or more receivers and a coherent signal. It is therefore, contemplated that various alternative embodiments and modifications may be made to the disclosed embodiments without departing from the spirit and scope of the disclosure defined by the appended claims and equivalents thereof.

The invention claimed is:

1. A method for optimizing source and receiver locations for acquiring data used in compressive sensing reconstruction, which comprises:
   a. creating a uniformly spaced target survey grid for available source locations and a uniformly spaced target survey grid for available receiver locations;
   b. dividing the target survey grid for available source locations and the target survey grid for available receiver locations into multiple source subgrids and multiple receiver subgrids, respectively;
   c. defining a local multidimensional mutual coherence map, representing an MC map, for each source subgrid and each receiver subgrid as a function of a sparsity promoting transform (F) and a multidimensional sampling function ($u_s$);
   d. solving each multidimensional sampling function for each respective source subgrid and each respective receiver subgrid using a global optimizer to iteratively minimize predetermined statistics for each respective MC map under predetermined target survey criteria and predetermined target survey constraints wherein the solution for each multidimensional sampling function determines i) local coordinates for each optimal source location in a respective source subgrid and each optimal receiver location in a respective receiver subgrid, and ii) a minimized MC map for each respective source subgrid and each respective receiver subgrid, each minimized MC map including a mutual coherence value at each (x,y) location in the minimized MC map;
   e. converting the local coordinates for each optimal source location and each optimal receiver location in a respective source subgrid and a respective receiver subgrid to global acquisition coordinates that each corresponds to a respective grid node on a respective source subgrid or a respective grid node on a respective receiver subgrid; and
   f. combining the optimal source and receiver locations in each respective source subgrid and in each respective receiver subgrid, and the corresponding minimized MC map for each respective source subgrid and each respective receiver subgrid, into a new, optimized, source survey with a combined MC map and a new, optimized, receiver survey with a combined MC map.

2. The method of claim 1, further comprising:
   g. displaying the new source survey and the new receiver survey with each respective combined MC map; and
   h. determining if the new source survey and the new receiver survey are valid based on the display of each respective combined MC map.

3. The method of claim 2, further comprising:
   identifying at least one invalid survey;
   entering new target survey criteria for each invalid survey; and
   repeating steps a-h for each invalid survey using the new target survey criteria.

4. The method of claim 2, further comprising:
   identifying at least one valid survey;
   entering new target survey constraints for each valid survey; and
   repeating steps a-h for each valid survey using the new target survey constraints.

5. The method of claim 1, wherein the target survey grid for available source locations and the target survey grid for available receiver locations are created using an initial survey for available source locations and an initial survey for available receiver locations, respectively, and the predetermined target survey criteria.

6. The method of claim 1, wherein each source subgrid and each receiver subgrid represents a respective process area.

7. The method of claim 6, wherein the number of multiple source subgrids and the number of multiple receiver subgrids are each equal to a predetermined number of process areas used for a domain.

8. The method of claim 1, wherein the MC map is defined as:

$$MC(x, y) = \frac{\max\|U_s'\|}{\max\|U_s\|}, \|U_s'\| < \max\|U_s\|, U_s' \in U_s;$$

and
   wherein $U_s = F u_s$.

9. The method of claim 8, wherein the predetermined statistics includes one of a minimum value, a mean value and a standard deviation.

10. A non-transitory program carrier device tangibly carrying computer-executable instructions for optimizing source and receiver locations for acquiring data used in compressive sensing reconstruction, the instructions being executable to implement;
 a. creating a uniformly spaced target survey grid for available source locations and a uniformly spaced target survey grid for available receiver locations;
 b. dividing the target survey grid for available source locations and the target survey grid for available receiver locations into multiple source subgrids and multiple receiver subgrids, respectively;
 c. defining a local multidimensional mutual coherence map, representing an MC map, for each source subgrid and each receiver subgrid as a function of a sparsity promoting transform (F) and a multidimensional sampling function ($u_s$);
 d. solving each multidimensional sampling function for each respective source subgrid and each respective receiver subgrid using a computer processor and a global optimizer to iteratively minimize predetermined statistics for each respective MC map under predetermined target survey criteria and predetermined target survey constraints wherein the solution for each multidimensional sampling function determines i) local coordinates for each optimal source location in a respective source subgrid and each optimal receiver location in a respective receiver subgrid, and ii) a minimized MC map for each respective source subgrid and each respective receiver subgrid, each minimized MC map including a mutual coherence value at each (x,y) location in the minimized MC map;
 e. converting the local coordinates for each optimal source location and each optimal receiver location in a respective source subgrid and a respective receiver subgrid to global acquisition coordinates that each corresponds to a respective grid node on a respective source subgrid or a respective grid node on a respective receiver subgrid; and
 f. combining the optimal source and receiver locations in each respective source subgrid and in each respective receiver subgrid, and the corresponding minimized MC map for each respective source subgrid and each respective receiver subgrid, into a new, optimized, source survey with a combined MC map and a new, optimized, receiver survey with a combined MC map.

11. The program carrier device of claim 10, further comprising:
 g. displaying the new source survey and the new receiver survey with each respective combined MC map; and
 h. determining if the new source survey and the new receiver survey are valid based on the display of each respective combined MC map.

12. The program carrier device of claim 11, further comprising:
 identifying at least one invalid survey;
 entering new target survey criteria for each invalid survey; and
 repeating steps a-h for each invalid survey using the new target survey criteria.

13. The program carrier device of claim 11, further comprising:
 identifying at least one valid survey;
 entering new target survey constraints for each valid survey; and
 repeating steps a-h for each valid survey using the new target survey constraints.

14. The program carrier device of claim 10, wherein the target survey grid for available source locations and the target survey grid for available receiver locations are created using an initial survey for available source locations and an initial survey for available receiver locations, respectively, and the predetermined target survey criteria.

15. The program carrier device of claim 10, wherein each source subgrid and each receiver subgrid represents a respective process area.

16. The program carrier device of claim 15, wherein the number of multiple source subgrids and the number of multiple receiver subgrids are each equal to a predetermined number of process areas used for a domain.

17. The program carrier device of claim 10, wherein the MC map is defined as:

$$MC(x, y) = \frac{\max\|U_s'\|}{\max\|U_s\|}, \|U_s'\| < \max\|U_s\|, U_s' \in U_s;$$

and
 wherein $U_s = F u_s$.

18. The program carrier device of claim 17, wherein the predetermined statistics includes one of a minimum value, a mean value and a standard deviation.

* * * * *